(12) United States Patent
O'Connell et al.

(10) Patent No.: US 9,108,726 B2
(45) Date of Patent: Aug. 18, 2015

(54) AIRCRAFT BRAKE SYSTEM

(71) Applicant: Honda Patents & Technologies North America, LLC, Torrance, CA (US)

(72) Inventors: Charles T. O'Connell, Summerfield, NC (US); Hiroki Oyama, Summerfield, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 38 days.

(21) Appl. No.: 13/944,929

(22) Filed: Jul. 18, 2013

(65) Prior Publication Data

US 2014/0014447 A1 Jan. 16, 2014

Related U.S. Application Data

(63) Continuation-in-part of application No. 13/879,660, filed as application No. PCT/US2011/056484 on Oct. 14, 2011.

(60) Provisional application No. 61/394,249, filed on Oct. 18, 2010.

(51) Int. Cl.
*G05G 1/04* (2006.01)
*B64C 25/44* (2006.01)

(52) U.S. Cl.
CPC *B64C 25/44* (2013.01); *G05G 1/04* (2013.01); *Y10T 74/20244* (2015.01)

(58) Field of Classification Search
USPC .............. 188/151 R, 152; 244/110 H, 110 A; 74/491, 500.5, 501.5 H, 501.6, 502, 74/503, 504; 303/89
See application file for complete search history.

(56) References Cited

U.S. PATENT DOCUMENTS 2,893,206 A 7/1959 Gelb
3,006,696 A 10/1961 Yarber
(Continued)

FOREIGN PATENT DOCUMENTS

CA 2814349 4/2012
DE 3844382 7/1989
(Continued)

OTHER PUBLICATIONS

Extended European Search Report of EP11 834 912.5 dated May 21, 2014, 7 pages.

(Continued)

*Primary Examiner* — Thomas J Williams
(74) *Attorney, Agent, or Firm* — Rankin, Hill & Clark LLP

(57) ABSTRACT

An aircraft emergency brake system includes a modulating emergency/parking brake valve in fluid communication with and disposed between a pressure source and a wheel brake and a lever assembly operatively connected with the brake valve. The emergency brake system is operative in first and second stages. The lever assembly includes a handle, a lock mechanism and an unlock mechanism. The handle is movable between a non-actuated position and a fully-actuated position. The brake pressure provided to the wheel brake through the brake valve depends on a position of the handle. The lock mechanism is operatively connected with the handle to obstruct the handle from moving from the first stage to the second stage. The unlock mechanism is disposed on the handle to unlock the lock mechanism allowing movement of the handle to the second stage position from the first stage position.

17 Claims, 17 Drawing Sheets

(56) References Cited

U.S. PATENT DOCUMENTS

| | | |
|---|---|---|
| 3,127,131 A | 3/1964 | Sudrow |
| 3,881,783 A | 5/1975 | Shiber |
| 4,236,757 A * | 12/1980 | Gregory .......................... 74/502 |
| 4,432,585 A | 2/1984 | Nezuka |
| 4,643,043 A | 2/1987 | Furuta et al. |
| 5,303,609 A | 4/1994 | Iwanaga et al. |
| 5,794,492 A | 8/1998 | Pare |
| 6,085,608 A | 7/2000 | Santoro et al. |
| 6,338,288 B1 | 1/2002 | Spadaccini et al. |
| 6,971,725 B2 | 12/2005 | Holder |
| 2006/0053953 A1 | 3/2006 | Choi |
| 2007/0137405 A1 | 6/2007 | Pereira et al. |
| 2007/0227290 A1 | 10/2007 | Ferenc et al. |
| 2009/0223191 A1 * | 9/2009 | Wilson ............................ 74/491 |
| 2010/0276988 A1 | 11/2010 | Cahill |

FOREIGN PATENT DOCUMENTS

| | | |
|---|---|---|
| DE | 202008005984 | 11/2008 |
| GB | 502647 | 3/1939 |

OTHER PUBLICATIONS

International Search Report and Written Opinion of PCT/US2011/056484 dated Mar. 21, 2012.

International Search Report and Written Opinion of PCT/US2014/046783 dated Nov. 4, 2014, 8 pages.

Office Action of U.S. Appl. No. 13/879,660 dated Nov. 17, 2014, 16 pages.

Office Action of U.S. Appl. No. 13/879,660 dated Feb. 27, 2015, 12 pages.

* cited by examiner

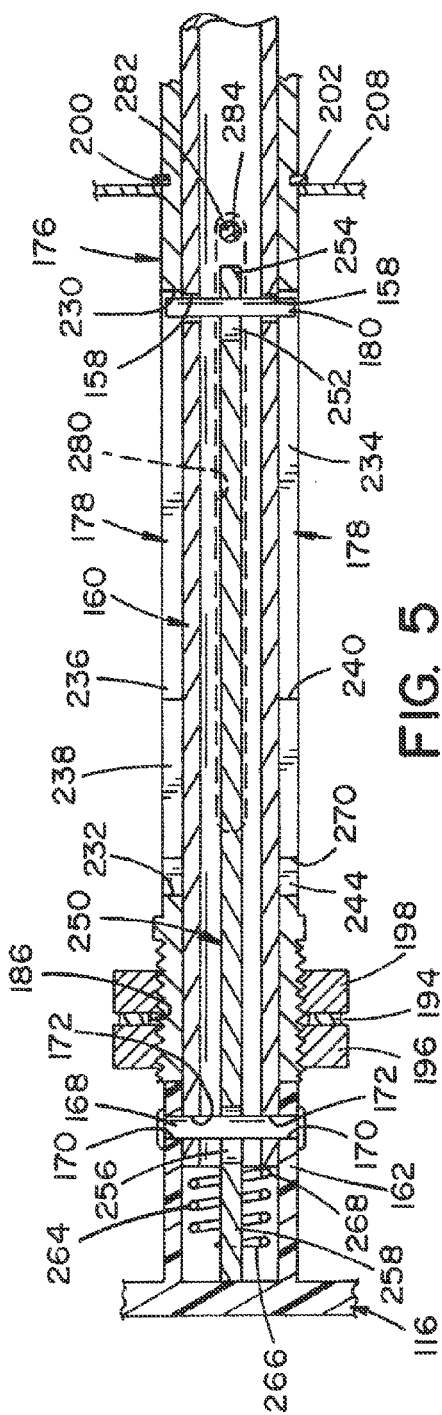
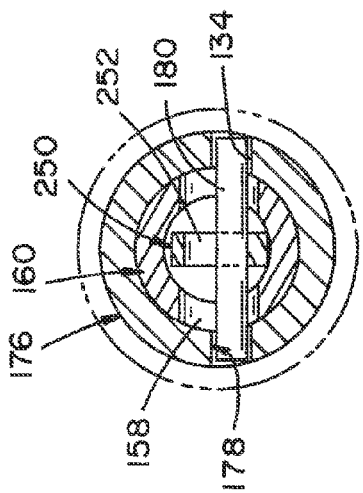
FIG. 5
FIG. 6

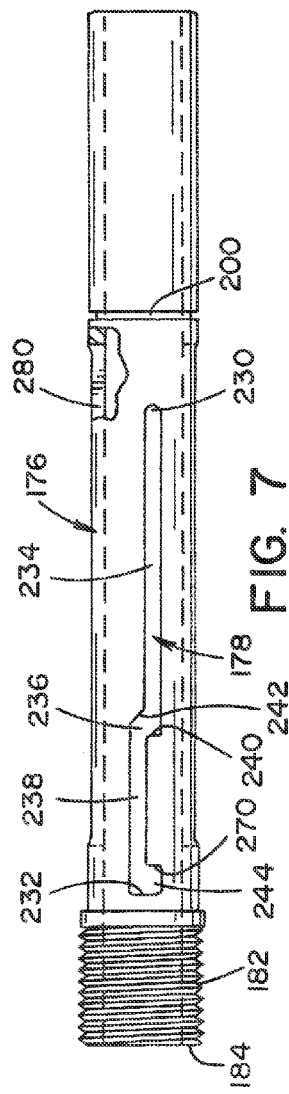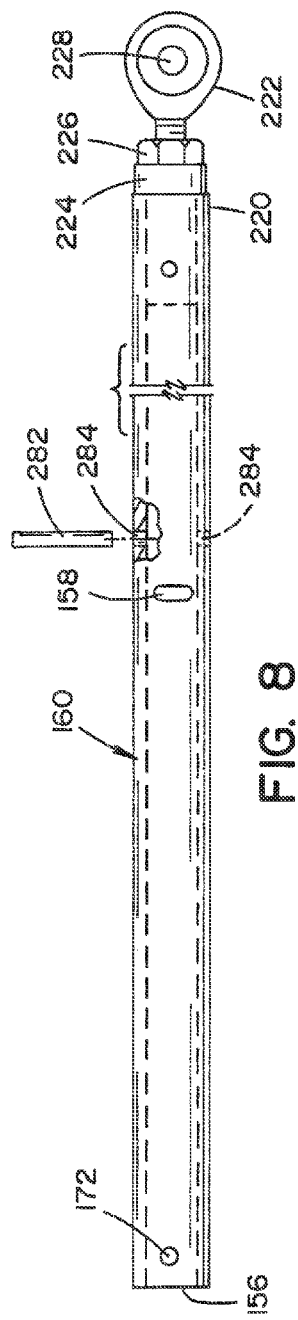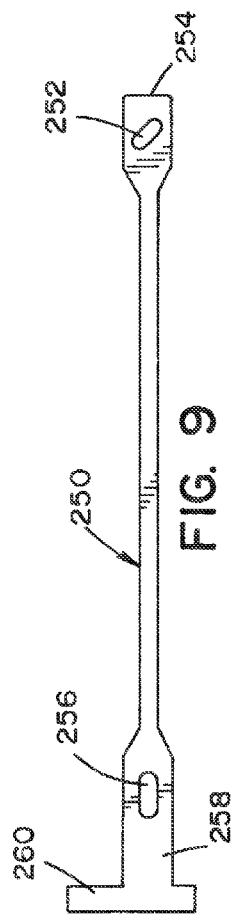

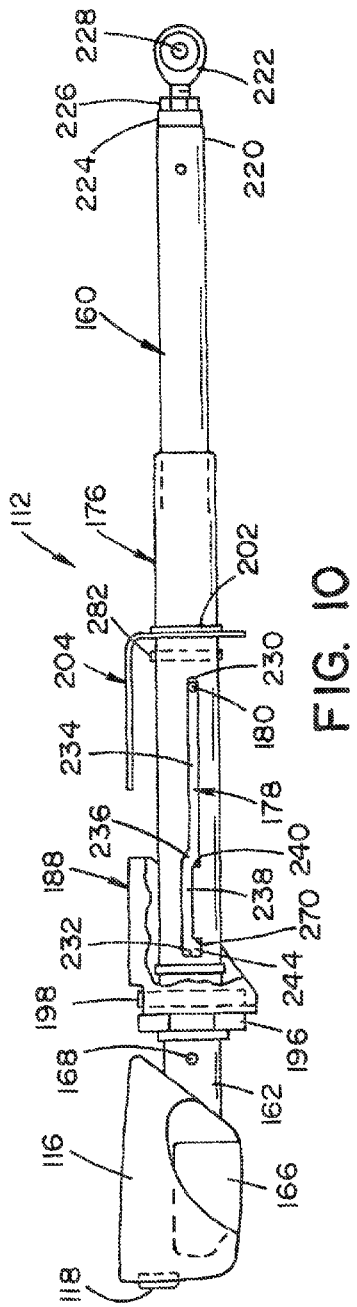
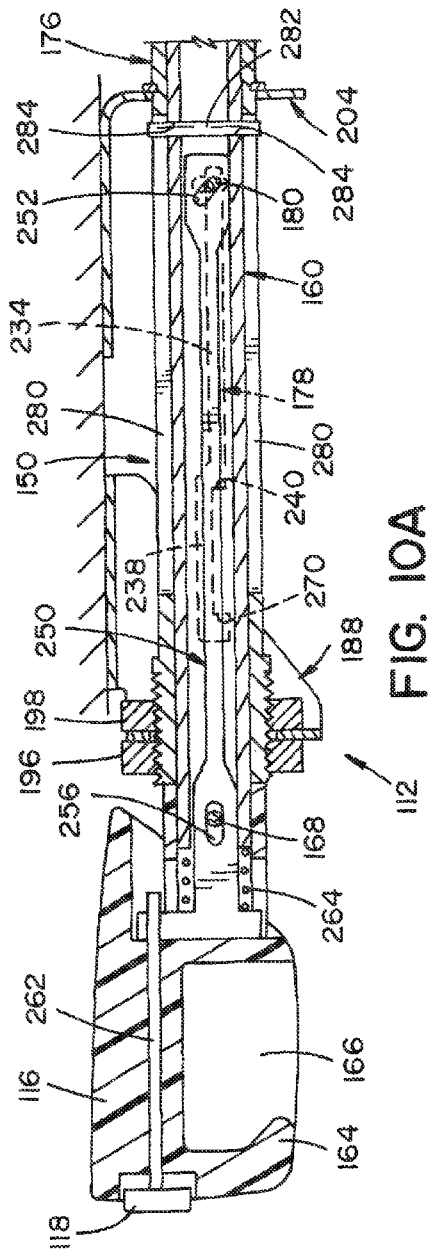
FIG. 10
FIG. 10A

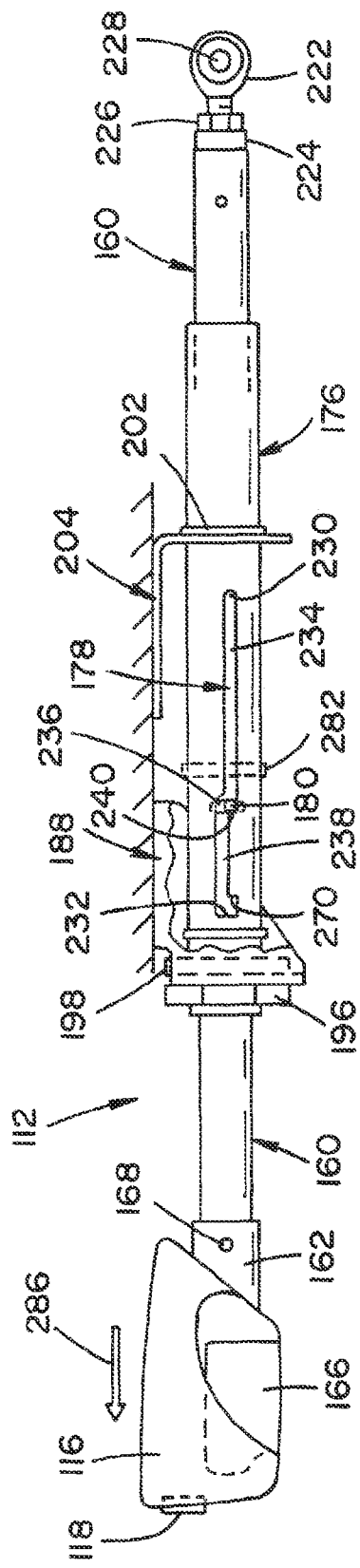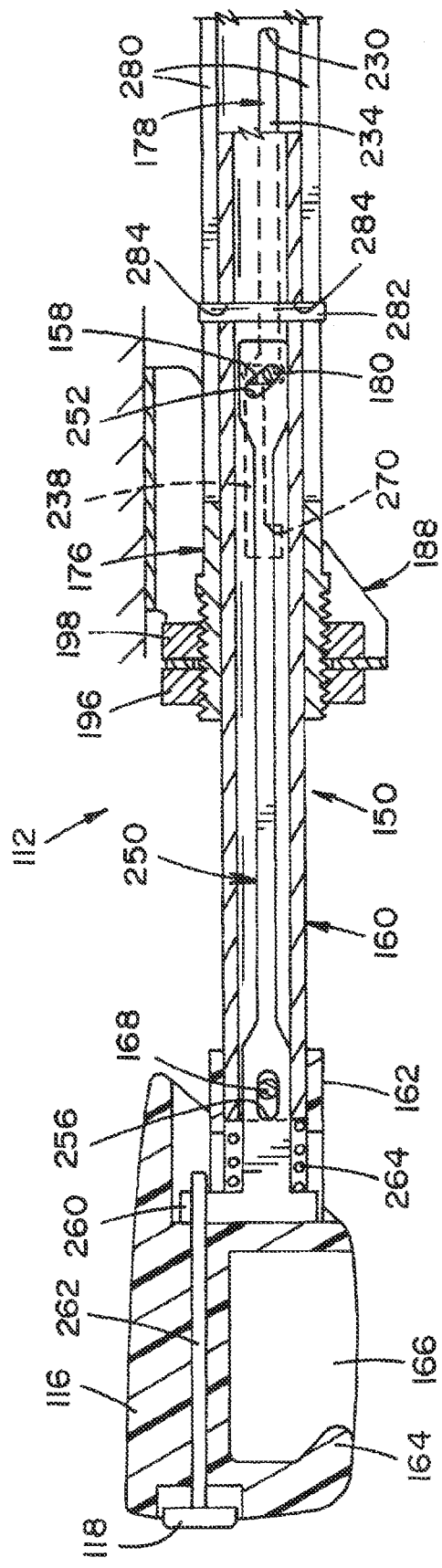
FIG. 11
FIG. 11A

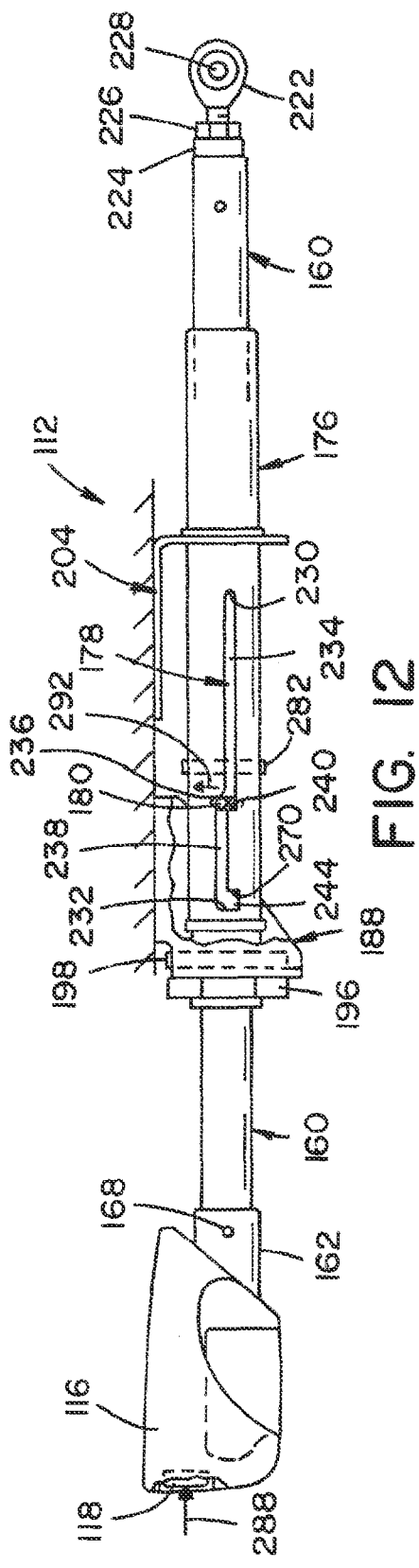
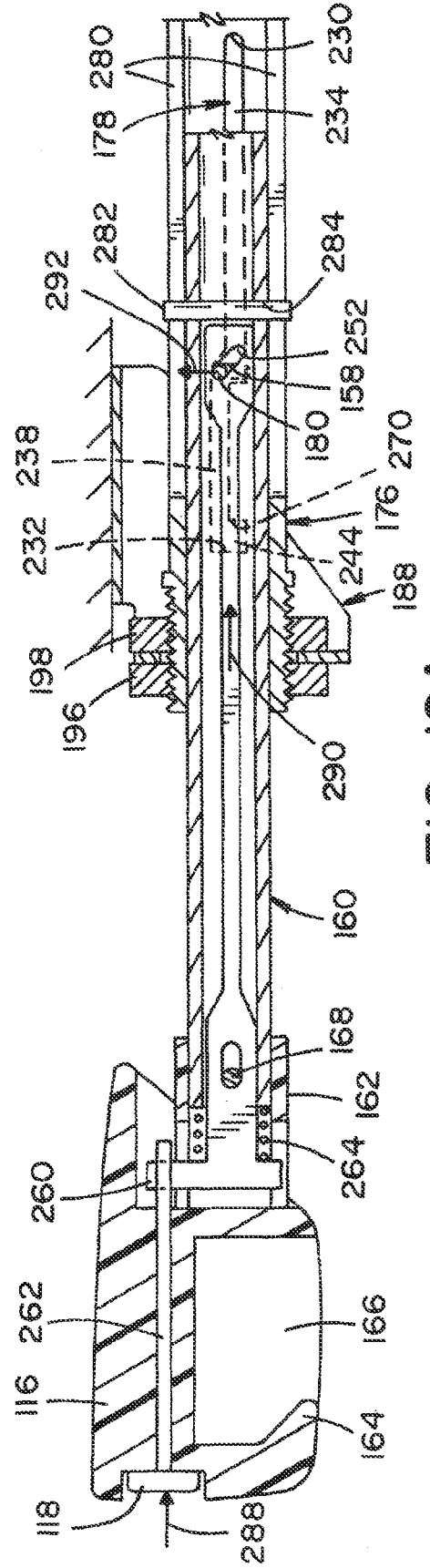

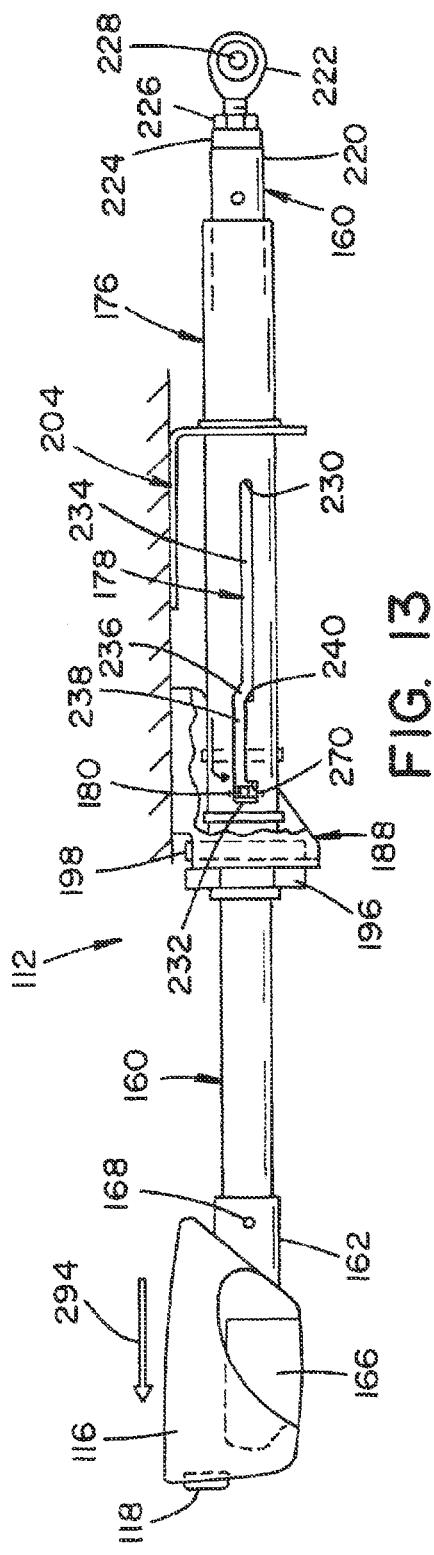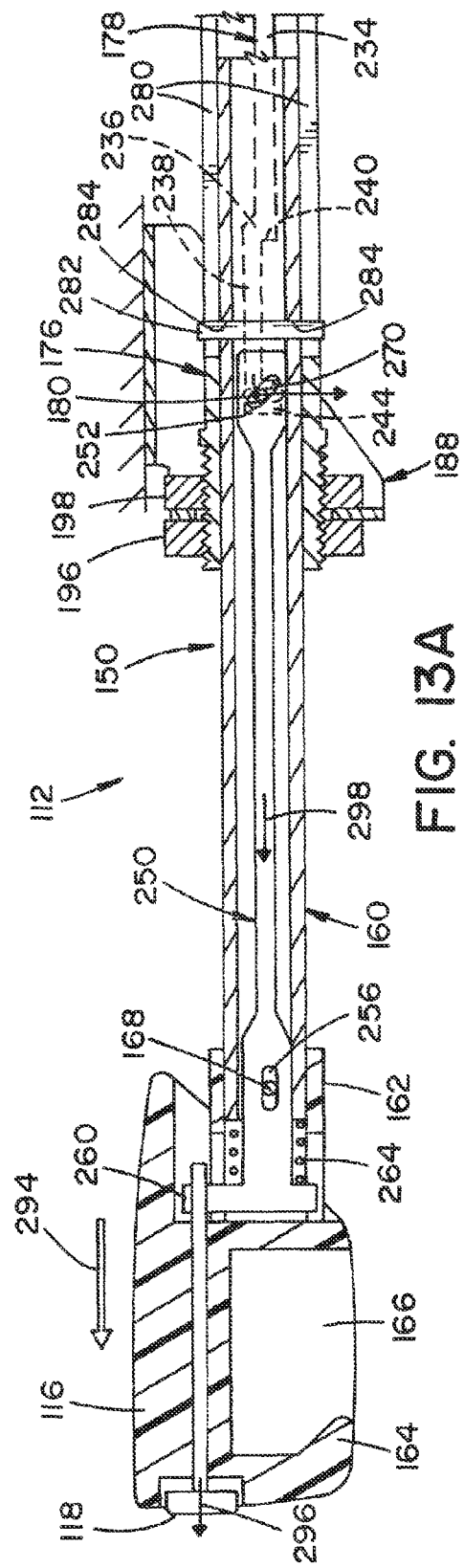

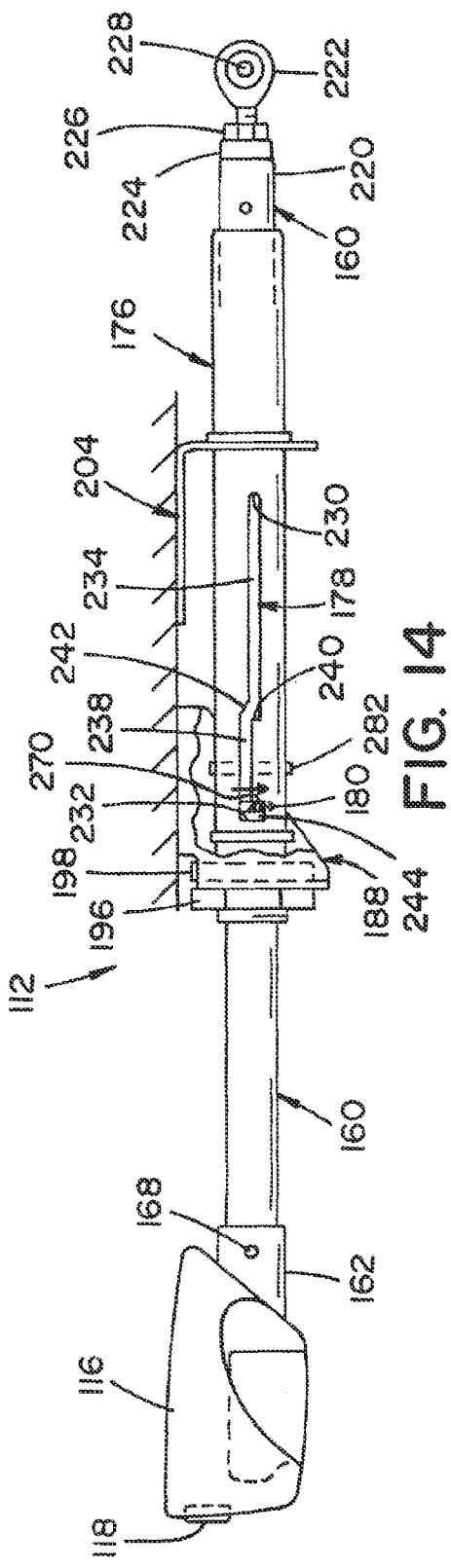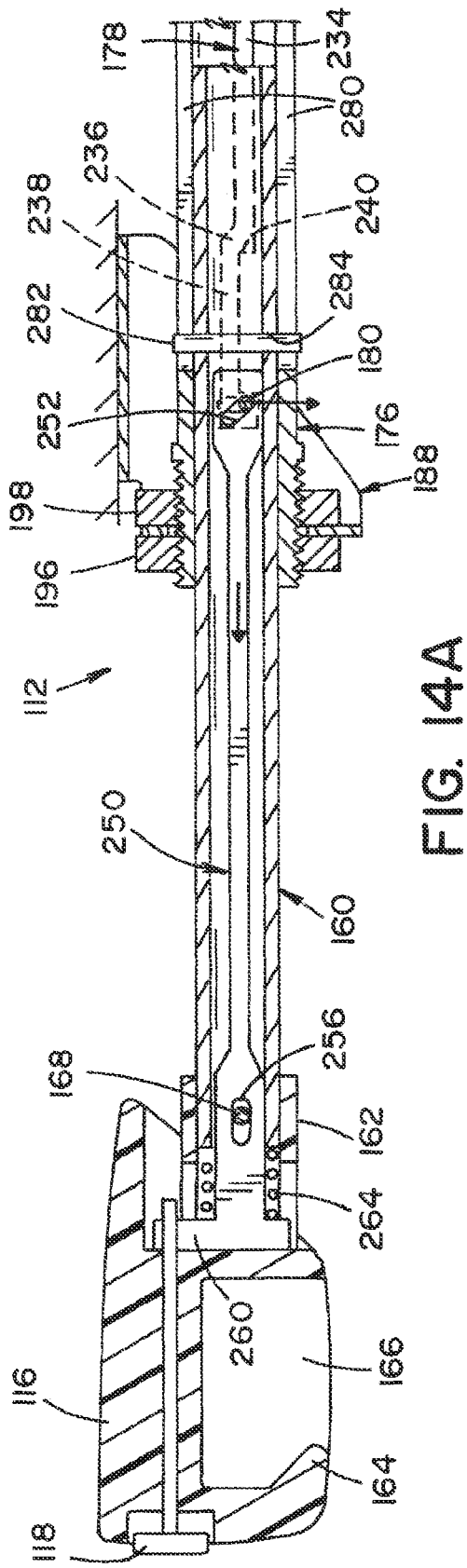

US 9,108,726 B2

AIRCRAFT BRAKE SYSTEM

This application is a continuation-in-part application of U.S. application Ser. No. 13/879,660, filed Apr. 16, 2013, which claims the benefit of PCT/US11/56484, filed Oct. 14, 2011, which claims the benefit of U.S. provisional patent application Ser. No. 61/394,249, filed Oct. 18, 2010. Each aforementioned application is incorporated by reference in its entirety herein.

BACKGROUND

Many types of aircraft, including small business jets, use power braking systems as the primary braking means for the aircraft. To deal with an unexpected failure of the power braking system, a non-powered redundant braking system is typically provided. One such redundant braking system includes a modulating emergency/parking brake valve in combination with an accumulated power device. The brake valve can direct a pressurized fluid (e.g., hydraulic or brake fluid, compressed air, etc.) from the accumulator to apply the aircraft's brakes when the primary braking system fails. In addition to providing emergency braking, the brake valve can also fully engage the brakes for long term parking.

Typically a control lever or other activated mechanism in the cockpit is mechanically connected to the brake valve to control the flow of pressurized fluid in the aircraft's hydraulic system to and from the brake cylinders at the wheels of the aircraft. In particular, an amount of braking pressure applied by the brake valve can correspond to the position of the control lever, which is operated by the pilot. Unfortunately, it can be difficult to precisely control applied brake pressure and supply appropriate aircraft deceleration using the control lever.

SUMMARY

An example of an emergency brake system for an aircraft includes a modulating emergency/parking brake valve in fluid communication with and disposed between a pressure source and a wheel brake and a lever assembly operatively connected with the brake valve. The emergency brake system is operative in a first stage to provide a moderate amount of brake pressure to the wheel brake and a second stage to provide a greater amount of brake pressure to the wheel brake. The lever assembly includes a handle, a lock mechanism and an unlock mechanism. The handle is movable between a non-actuated position where the wheel brake is disengaged and a fully-actuated position where the wheel brake is fully engaged. The brake pressure provided to the wheel brake through the brake valve is provided according to a position of the handle. The lock mechanism is operatively connected with the handle to obstruct the handle from moving from a first stage position, where the emergency brake system is operative in the first stage, to a second stage position, where the emergency brake system is operative in the second stage. The unlock mechanism is disposed on the handle to unlock the lock mechanism to allow movement of the handle to the second stage position from the first stage position.

An example of a method for operating an emergency brake system for an aircraft is also described. The emergency brake system includes a modulating emergency/parking brake valve in fluid communication with a pressure source and a wheel brake. The brake valve is disposed between the pressure source and the wheel brake. The method includes operating the emergency brake system in a first stage by moving a handle of a lever assembly from a non-actuated position where the brake is disengaged to an intermediate position where the handle is precluded from further movement toward a fully-actuated position until a lock mechanism, which is operatively connected with the handle, is unlocked. The method also includes unlocking the lock mechanism. The method further includes operating the emergency brake system in a second stage by moving the brake handle from the intermediate position toward the fully-actuated position after unlocking the lock mechanism.

A lever assembly for an aircraft emergency/parking brake includes a handle, a lock mechanism and an unlock mechanism. The lock mechanism is operatively connected with the handle. Movement of the handle from an intermediate position to a fully-actuated position is obstructed by the lock mechanism to prevent inadvertent operating of the brake in the fully-actuated position unless the lock mechanism is unlocked. The unlock mechanism is operatively connected with the handle for unlocking the lock mechanism.

BRIEF DESCRIPTION OF THE DRAWINGS

FIG. 5 is a cross-sectional view of the lever assembly taken along the line 5-5 of FIG. 4.

FIG. 6 is a cross-sectional view taken along the line 6-6 of FIG. 4.

FIG. 7 is a side and partial cross-sectional view of a guide track link of the lever assembly.

FIG. 8 is a side and partial cross-sectional view of a handle link of the lever assembly.

FIG. 9 is a side view of a button link of the lever assembly.

FIG. 10 is a schematic side view of the lever assembly shown in a non-actuated position.

FIG. 10A is a cross-sectional view of part of the lever assembly of FIG. 10.

FIG. 11 is a schematic side view of the lever assembly shown in an intermediate position before a button actuator is depressed.

FIG. 11A is a cross-sectional view of part of the lever assembly of FIG. 11.

FIG. 12 is a schematic side view of the lever assembly shown in the intermediate position shown with the button actuator depressed.

FIG. 12A is a cross-sectional view of part of the lever assembly of FIG. 12.

FIG. 13 is a schematic side view of the lever assembly shown in a fully-actuated position.

FIG. 13A is a cross-sectional view of part of the lever assembly of FIG. 13.

FIG. 14 is a schematic side view of the lever assembly shown locked in the fully-actuated position.

FIG. 14A is a cross-sectional view of part of the lever assembly of FIG. 14.

DETAILED DESCRIPTION

Figure 1:
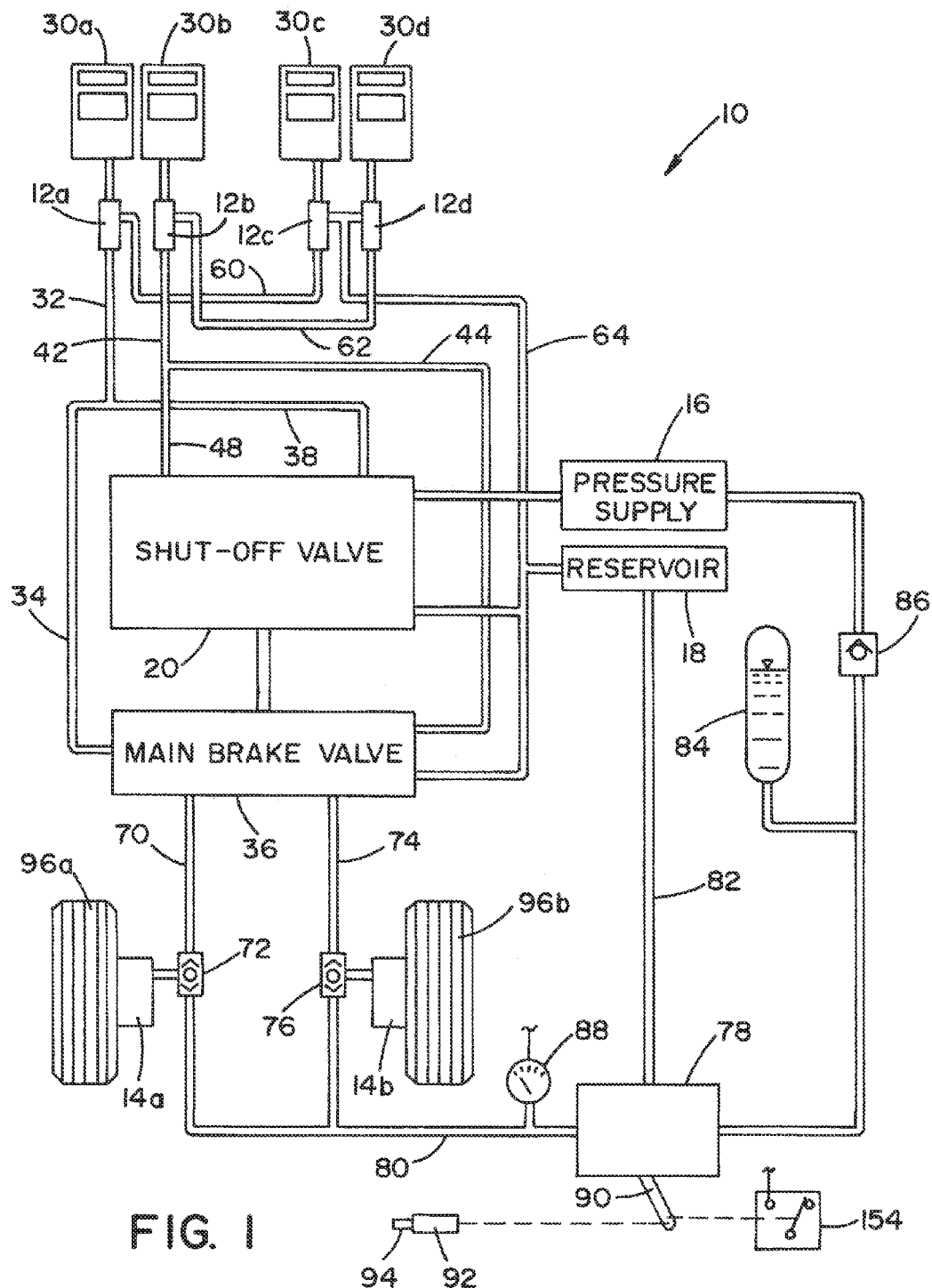
FIG. 1 is a schematic depiction of a hydraulic brake system for an aircraft.

The descriptions and drawings herein are merely illustrative and various modifications and changes can be made in the structures disclosed without departing from the scope of the appended claims. Various identified components of a hydraulic system and an emergency/parking brake system disclosed herein are merely terms of art and may vary from one manufacturer to another. The terms should not be deemed to limit the present disclosure or the appended claims. The drawings are shown for purposes of illustrating one or more exemplary embodiments and are not for purposes of limiting the appended claims. All references to direction and position, unless otherwise indicated, refer to the orientation of the components illustrated in the drawings and should not be construed as limiting the appended claims.

Referring now to the drawings, FIG. 1 schematically depicts a hydraulic system 10 for an aircraft. The hydraulic system 10 includes a master cylinder, and in the depicted example, the hydraulic system 10 includes a pilot left-hand master cylinder 12a, a pilot right-hand master cylinder 12b, a co-pilot left-hand master cylinder 12c, and a co-pilot right-hand master cylinder 12d. The hydraulic system 10 also includes a wheel brake, which in the depicted embodiment includes a left-hand wheel brake 14a and a right-hand wheel brake 14b. The hydraulic system 10 also includes a pressure supply 16, which can be an electrical motor driven hydraulic pump. The hydraulic system 10 also includes a reservoir 18, which can be a vented reservoir or tank or a pressurized reservoir or tank. The hydraulic system 10 also includes a shut-off valve 20 in communication with the master cylinders 12a-12d, the wheel brakes 14a, 14b, the pressure supply 16 and the reservoir 18.

The pilot left-hand master cylinder 12a is operated by a pilot left-hand pedal 30a. The pilot right-hand master cylinder 12b is operated by a pilot right-hand pedal 30b. The co-pilot left-hand master cylinder 12c is operated by a co-pilot left-hand pedal 30c. The co-pilot right-hand master cylinder 12d is operated by a co-pilot right-hand pedal 30d.

A left-hand master cylinder outlet line 32 connects with the pilot left-hand master cylinder 12a. The left-hand master cylinder outlet line 32 branches to connect with a left-hand brake valve supply line 34, which connects with a main brake valve 36. The main brake valve 36 can include brake metering valves (not shown) and an anti-skid valve (not shown). The left-hand master cylinder outlet line 32 also branches to a left-hand shut-off valve supply line 38 to connect with the shut-off valve 20. A right-hand master cylinder outlet line 42 connects with the pilot right-hand master cylinder 12b. The right-hand master cylinder outlet line 42 branches to connect with a right-hand brake valve supply line 44, which connects with the main brake valve 36. The right-hand master cylinder outlet line 42 also branches to a right-hand shut-off valve supply line 48, which connects with the shut-off valve 20.

A first connecting line 60 connects the co-pilot left-hand master cylinder 12c to the pilot left-hand master cylinder 12a. Accordingly, upon actuation of the co-pilot left-hand pedal 30c, fluid exits the pilot left-hand master cylinder 12a through the left-hand master cylinder outlet line 32. Similarly, a second connecting line 62 connects the co-pilot right-hand master cylinder 12d to the pilot right-hand master cylinder 12b. A master cylinder return line 64 also connects with the co-pilot left-hand master cylinder 12c and the co-pilot right-hand master cylinder 12d to connect the master cylinders 12c, 12d to the reservoir 18.

A left-hand brake supply line 70 connects the left-hand brake 14a to the main brake valve 36 through a left-hand shuttle valve 72. A right-hand brake supply line 74 connects the right-hand brake 14b to the main brake valve 36 through a right-hand shuttle valve 76. Both the left-hand brake 14a and the right-hand brake 14b connect with a modulating emergency/parking brake valve 78 via an emergency/parking brake pressure line 80. The emergency/parking brake valve 78 can communicate with the reservoir 18 via a return line 82.

The modulating emergency/parking brake valve 78 is in fluid communication with a pressure source, which in the illustrated embodiment can be the pressure supply 16, which supplies hydraulic pressure for the hydraulic system 10, and/or an accumulator 84. The emergency/parking brake valve 78 is also in fluid communication with a wheel brake such as the left-hand brake 14a and the right-hand brake 14b via the brake pressure line 80. A check valve 86 is interposed between the accumulator 84 and the pressure supply 16 to prohibit back flow from the accumulator 84 toward the pressure supply 16. A pressure gage 88 can be interposed between the emergency/parking brake valve 78 and the wheel brakes 14a, 14b to measure the brake pressure being supplied to the wheel brakes 14a, 14b from the emergency/parking brake valve 78.

The emergency/parking brake valve 78 includes an actuator 90 connected with a lever assembly 92 (depicted schematically in FIG. 1), which includes a handle 94 (also depicted schematically in FIG. 1). The emergency/parking brake valve 78 and the lever assembly 92 make up an emergency brake system that works in company with the primary braking system, which is controlled by the main brake valve 36. Pressure can be applied to the left-hand wheel brake 14a to retard rotation of the left-hand wheel 96a or to the right-hand wheel brake 14b to retard rotation of the right-hand wheel 96b.

Figure 2:
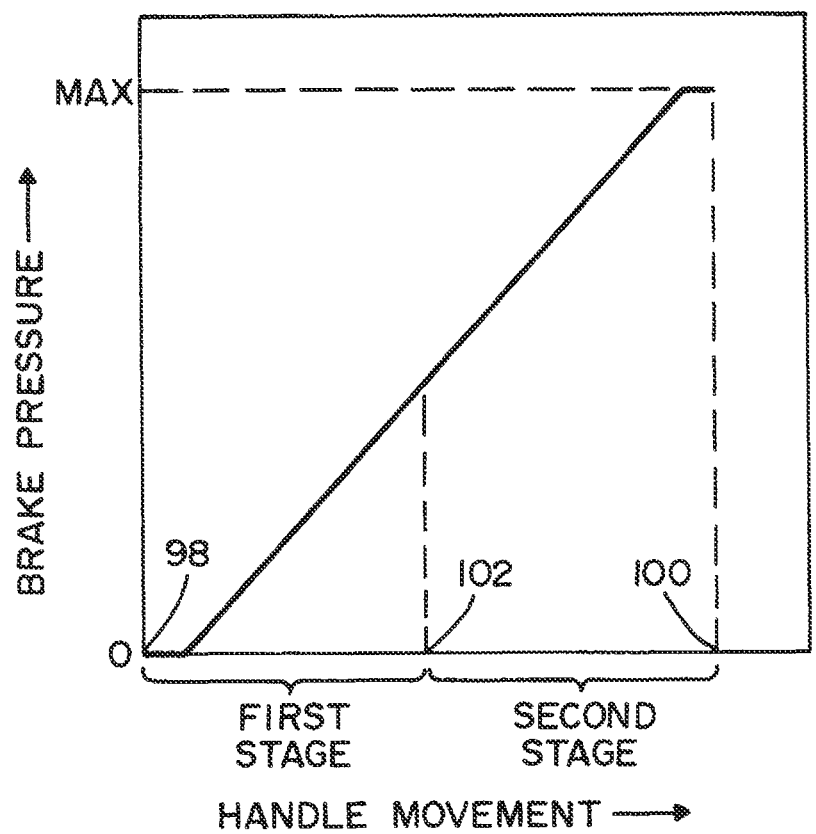
FIG. 2. is a graph depicting handle movement versus brake pressure for a handle of an emergency/parking brake system forming a part of the hydraulic brake system depicted in FIG. 1.

With reference to FIG. 2, the emergency brake system is operative in a first stage to provide a moderate amount of brake pressure to the wheel brakes 14a, 14b and a second stage to provide a greater amount of brake pressure to the wheel brakes 14a, 14b. FIG. 2 is a graph depicting brake pressure delivered from the emergency/parking brake valve 78 to the wheel brakes 14a, 14b in relation to a position of the handle 94. The handle 94 (FIG. 1) is movable between a non-actuated position 98 where the wheel brakes 14a, 14b (FIG. 1) are disengaged (e.g., zero brake pressure is being delivered from the emergency/parking brake valve 78) and a fully-actuated position 100 where the wheel brakes 14a, 14b (FIG. 1) are fully engaged (e.g., maximum brake pressure is being delivered from the emergency/parking brake valve 78). As evident from FIG. 2, the amount of brake pressure provided to the wheel brakes 14a, 14b (FIG. 1) depends on a position of the handle 78 (FIG. 1).

As will be described in more detail below, the lever assembly 92 also includes a lock mechanism operatively connected with the handle 94 to obstruct the handle 94 from moving the emergency brake system from the first stage to the second stage. As will also be described in more detail below, the lever assembly 92 also includes an unlock mechanism disposed on the handle 94 to unlock the lock mechanism to allow the handle 94 to move the emergency brake system from the first stage to the second stage. As will be described further below and with continued reference to FIG. 2, the handle 94 (FIG. 1) is movable from the non-actuated position 98 to an intermediate position 102, which is between the non-actuated position 98 and the fully-actuated position 100. However, the handle 94 (FIG. 1) is precluded from movement from the intermediate position 102 towards the fully-actuated position 100 when the lock mechanism is locked. This lock mechanism prevents the pilot from applying too much brake pressure. On the other hand, maximum brake pressure can be provided in the second stage. When the pilot unlocks the lock mechanism in the first stage, the pilot can further move the handle 94 (FIG. 1) toward the fully-actuated position 100.

With continued reference to FIG. 2, the brake pressure provided to the wheel brakes 14a, 14b (FIG. 1) from the emergency/parking brake valve 78 (FIG. 1) in the first stage is provided according to a position of the handle 94 (FIG. 1). When the system is operating in the first stage, a lower brake pressure is provided to the wheel brakes 14a, 14b when the handle 94 (FIG. 1) is nearer the non-actuated position 98 as compared to the intermediate position 102. The emergency brake system is operating in the first stage when the handle 94 (FIG. 1) is in any position between the non-actuated position 98 and the intermediate position 102. The brake pressure provided to the wheel brakes 14a, 14b (FIG. 1) from the emergency/parking brake valve 78 (FIG. 1) when the system is operating in the second stage is also provided according to a position of the handle 94 (FIG. 1). The emergency brake system is operating in the second stage when the handle 94 (FIG. 1) is in any position between the intermediate position 102 and the fully-actuated position 100. In the second stage, a greater brake pressure is provided to the wheel brakes 14a, 14b (FIG. 1) when the handle 94 (FIG. 1) is nearer the fully-actuated position 100 as compared to the intermediate position 102.

Figure 3:
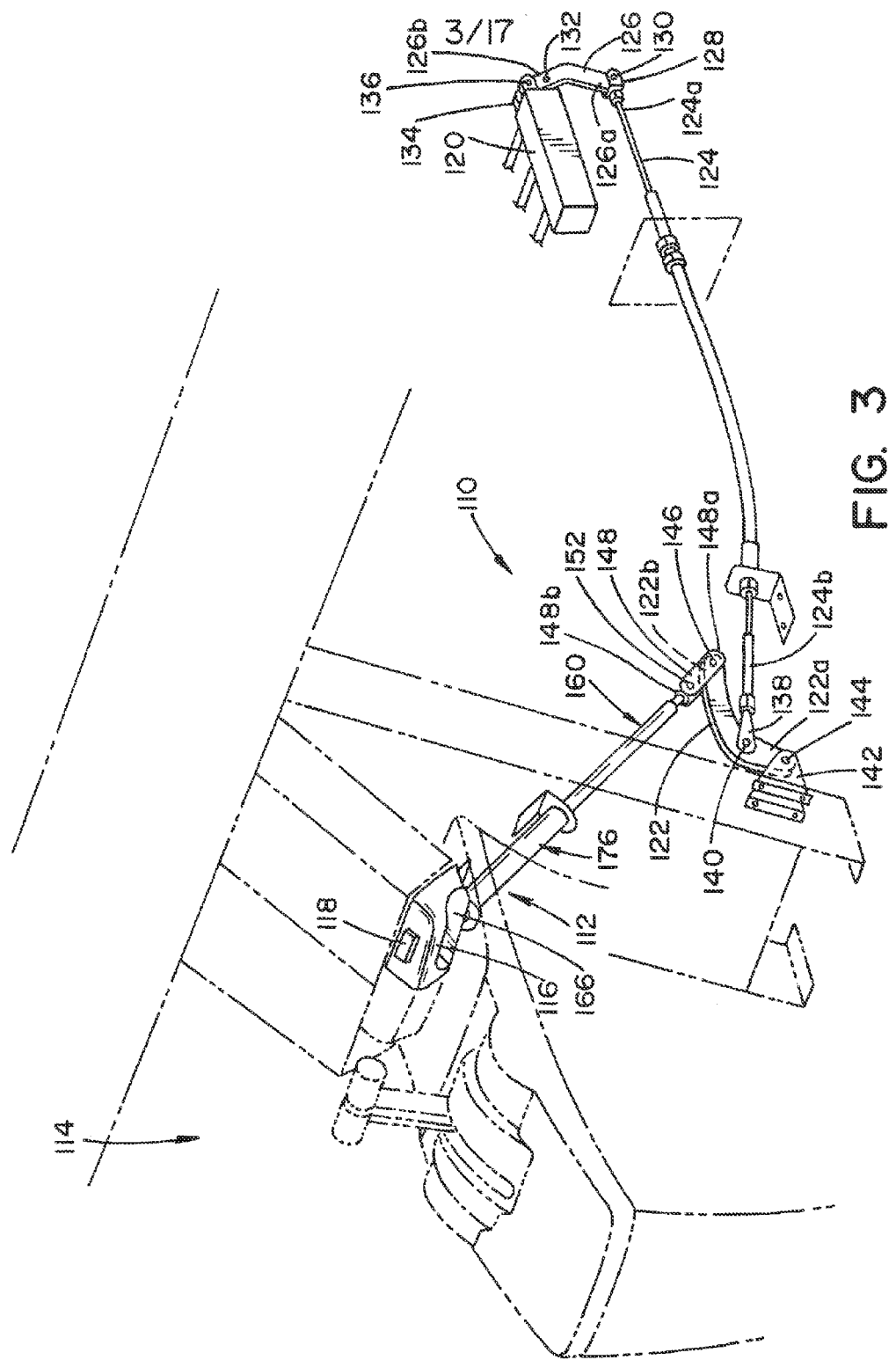
FIG. 3 is a diagram illustrating an example of an aircraft emergency/parking brake system showing a brake handle disposed in an aircraft cockpit area and mechanically connected to a forwardly disposed brake valve forming a part of the hydraulic brake system depicted in FIG. 1.

FIG. 3 illustrates an embodiment of an aircraft emergency/parking brake system 110 having a lever assembly 112 including a handle 116 disposed in a cockpit area 114 of an aircraft. The handle 116 is functionally equivalent to the handle 94 shown in FIG. 1. In the embodiment illustrated in FIG. 3, the handle 116 is provided for operating an emergency/parking brake valve 120 in the first stage (see FIG. 2) and the second stage (see FIG. 2). The emergency/parking brake valve 120 shown in FIG. 3 is functionally equivalent to the emergency/parking brake valve 78 shown in FIG. 1. The handle 116 is part of a lever assembly 112, which is functionally equivalent to the lever assembly 92 shown in FIG. 1. In FIG. 3, a button actuator 118 disposed on the handle 116 for enabling the handle 116 to be moved so as to change actuation of the modulated braking force in the emergency/parking brake system 110 from the first stage to the second stage (see FIG. 2). As will be described in more detail below, the handle 116 illustrated in FIG. 3 is mechanically connected to the emergency/parking brake valve 120 through the lever assembly 112 by a pivotal link 122, which can be a banana link, a push-pull cable 124 and an actuator 126. The handle 116 is mechanically connected to the emergency/parking brake valve 120 so that the position of the handle 116 is mechanically communicated to the emergency/parking brake valve 120.

The push-pull cable 124 connects to the actuator 126 (which is functionally equivalent to the actuator 90 depicted in FIG. 1) through a first clevis 128. A first end 124a of the push-pull cable 124 connects with the first clevis 128. A pin 130 connects a first end 126a of the actuator 126 with the first clevis 128, which allows the actuator 126 to pivot with respect to the first clevis 128. The actuator 126 connects with a static structure (not shown in FIG. 3) through an axle 132. The actuator 126 pivots on the axle 132 with respect to the static structure. A second end 126b of the actuator 126 connects with a spindle 134 (or other valve control member) with a pin 136. Rotation of the actuator 126 on the axle 132 results in translational movement of the spindle 136 to change the operating state of the emergency/parking brake valve 120. The push/pull cable 124 transmits pushing and pulling action of the handle 116 to the emergency/parking brake valve 120, and particularly to the actuator 126 of the emergency/parking brake valve 120.

The pivotal link 122 connects with the push-pull cable 124 through a second clevis 138. A second end 124b of the push-pull cable 124 connects with the second clevis 138. The second clevis 138 connects with the pivotal link 122 with a pin 140, which allows the second clevis 138 to pivot with respect to the pivotal link 122. A lower end 122a of the pivotal link 122 connects with a fixed mounting 142 via an axle 144 about which the pivotal link 122 rotates. An upper end 122b of the pivotal link 122 receives a pin 146 to connect the pivotal link 122 with a lower end 148a of an idle link 148. An upper end 148b of the idle link 148 receives a pin 152 to operatively connect with the handle 116 in a manner that will be described in more detail below.

With reference to FIG. 1, an electrical switch 154 can also be provided as shown operatively connected to the actuator 90 for switching between an OFF position when the actuator 90 (or the actuator 126 in FIG. 3) is in a non-actuated position corresponding to the non-actuated position 98 (FIG. 2) of the handle 116 and an ON position when the actuator 90 (or the actuator 126 in FIG. 3) is in any other position corresponding to the handle 116 being in any other position than the non-actuated position 98 (FIG. 2). The switch 154 can be used, for example, for illuminating an indicator (not shown) in the cockpit 114 to indicate that emergency and/or parking braking is being applied by the emergency/parking brake valve 120.

Figure 4:
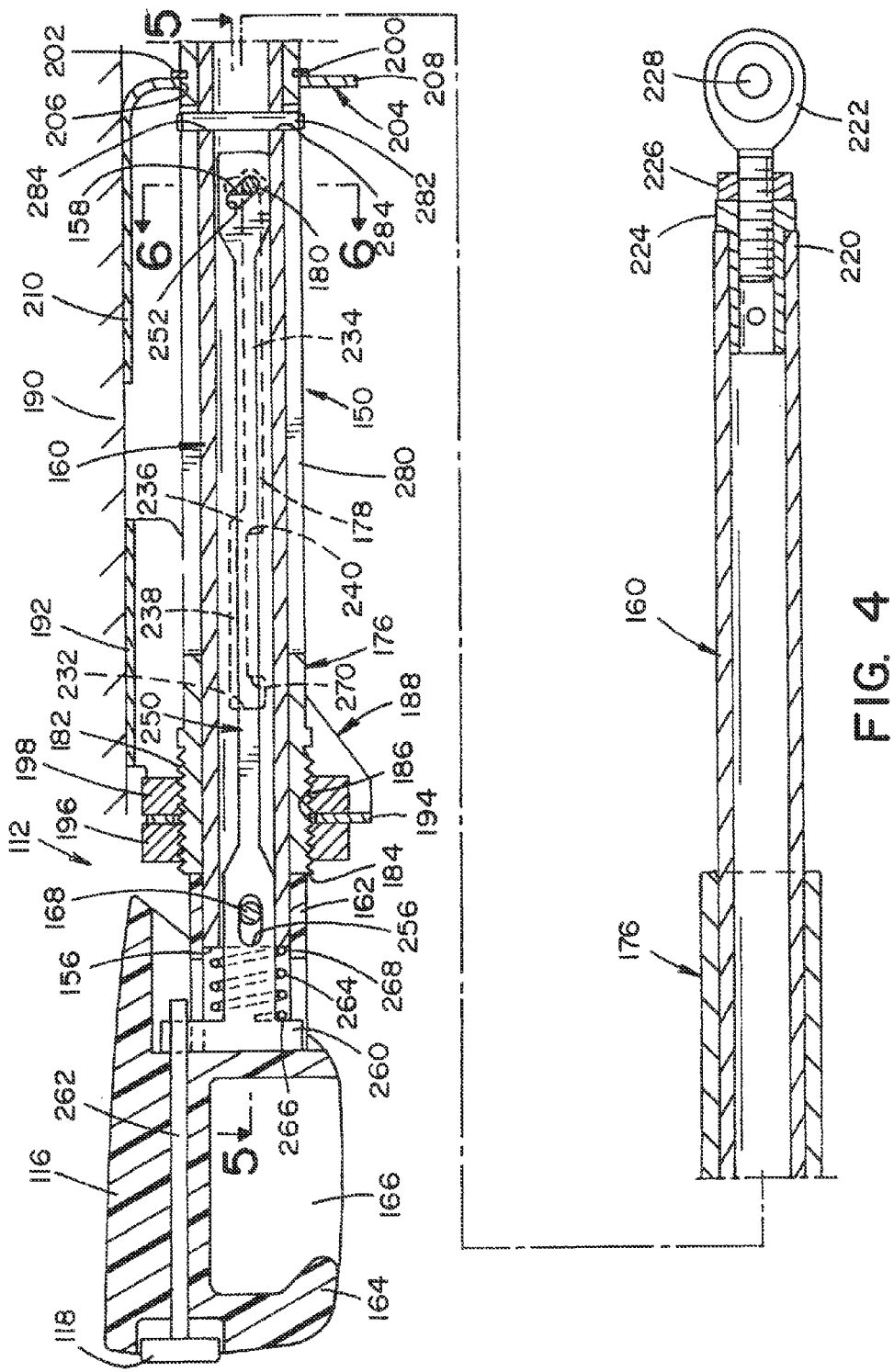
FIG. 4 is a cross-sectional view of a lever assembly of the emergency/parking brake system shown in FIG. 3.

With reference to FIGS. 4-6, the brake handle 116 is shown. The handle 116 is linearly movable in a first direction (to the left in FIG. 4). Movement of the handle 116 in the first direction beyond the intermediate position 102 (FIG. 2) is prevented by a lock mechanism 150. Accordingly, the handle 116 is freely movable in the first stage from the non-actuated position 98 (FIG. 2) to the intermediate position 102 (FIG. 2) such that the emergency/parking brake valve 120 applies a moderate amount of braking force (see FIG. 2).

The button actuator 118 disposed on the handle 116 is operatively connected to the lock mechanism 150. Actuation of the button actuator 118, as will be described in more detail below, disengages the lock mechanism 150 to allow movement of the handle 116 in the first direction into the second stage from the intermediate stop position 102 (FIG. 2) to a fully-actuated position 100 (FIG. 2). By this arrangement, the handle 116 is movable between the non-actuated position 98 (FIG. 2) wherein the wheel brake 14a, 14b (FIG. 1) is disengaged and the fully-actuated position 100 (FIG. 2) wherein the wheel brake 14a, 14b (FIG. 1) is fully engaged. However, movement of the handle 116 from the intermediate position 100 (FIG. 2) to the fully-actuated position 100 (FIG. 2) is obstructed by the lock mechanism 150 to prevent inadvertent operation of the wheel brake 14a, 14b (FIG. 1) unless the button actuator 118 is depressed (i.e., the button actuator 118 communicating the pilot's intention to place the emergency/parking brake system 110 in the second stage—see FIG. 2).

The lever assembly 112 includes a handle link 160 (shown in isolation in FIG. 8) connected to the handle 116. The handle link 160 moves longitudinally with the handle 116 as the handle 116 is moved. In the illustrated embodiment, the handle link 160 is tube-shaped and has a first end 156 received within a tubular portion 162 of the handle 116 and fixedly secured thereto. The handle 116 includes a gripping portion 164 disposed adjacent an underside recess 166 which enables a pilot to easily manipulate the handle 116 for longitudinal movement of the handle 116 and the handle link 160. As best shown in FIG. 5, a rivet-type pin 168 can fixedly secure the handle link 160 to the handle 116, and particularly the tubular portion 162 of the handle 116. Accordingly, the pin 168 can be received through apertures 170 defined in the tubular portion 162 and through apertures 172 (one shown in FIG. 8), which are in registry with the apertures 170. A distal end 220 of the handle link 160 can be secured to the pivotal link 122 (FIG. 3) via an attaching member 222. As shown, the attaching member 222 is secured to the distal end 220 by mounting members 224, 226 and includes an aperture 228 for connecting the attaching member 222 to the pivotal link 122 (FIG. 3) via the pin 152. As such, movement of the handle link 160 results in pivotal movement of the pivotal link 122, which results in pushing or pulling action on the push-pull cable 124 and rotational movement of the actuator 126.

The lever assembly 112 further includes a guide track link 176 (shown in isolation in FIG. 7) having a guide track 178 defined therein and mounted to allow relative movement of the handle link 160 therealong as the handle 116 is moved (i.e., the handle 116 and the handle link 160 are movable relative to the guide track link 176 and the guide track 178). In particular, the guide track link 176 can be tubular and can receive the handle link 160 therein in telescoping relation. The lock mechanism 150 can comprise a pin 180 received in the guide track 178 and configured for non-relative longitudinal movement of the pin 180 with the handle 116. More particularly, the pin 180 can be connected to the handle link 160, such as by receipt through slots 158 in handle link 160, and thereby connected to the handle 116 for longitudinal movement with the handle link 160 and the handle 116 such that the pin 180 moves longitudinally along the guide track 178 as the handle 116 is moved. In the illustrated embodiment, the guide track 178 is a pair of guide tracks 178 defined along diametrically opposed portions of the guide link 176. Thus, opposite end portions of the pin 180 are received in the guide tracks 178 and configured to move along the guide tracks 178 as the handle 116 is moved.

In the embodiment illustrated in FIG. 3, the guide track link 176 is fixedly mounted in the cockpit area 114 of the aircraft. As shown in FIG. 7, the guide track link 176 can have a threaded region 182 disposed adjacent a first end 184 of the guide track link 176. With reference to FIG. 4, the threaded region 182 can be received through an aperture 186 defined in a mounting bracket 188 which is fixedly secured to a static structure 190 provided in the cockpit area 114 (FIG. 3). For example, the bracket 188 can have a mounting portion 192 welded to the static structure 190, which can be a body portion of the aircraft. In particular, the aperture 186 can be defined in a flange portion 194 of the bracket 188. A pair of threaded members 196, 198 can be threadedly engaged with the guide track link 176 along the threaded region 182 for fixedly securing the guide track link 176 to the bracket 188, and in turn to the static structure 190 within the aircraft.

Spaced apart from the threaded region 182 on an opposite side of the guide track 178, the guide track link 176 can include a circumferential groove 200. The groove 200 can receive a lock ring 202 which seats against a bracket 204. The bracket 204 can include an aperture 206 through which the guide track link 176 is received, the aperture 206 being defined in a flange portion 208 of the bracket 204. A mounting portion 210 of the bracket 204 can be fixedly secured to the static structure 190 in the same manner as described in reference to the mounting portion 192 of the bracket 188 (e.g., welding). By this arrangement, the guide track link 176 is non-movably mounted to the static structure 190, whereas the handle link 160 and the handle 116 are movable with respect to the static structure 190.

As best shown in FIG. 7, each guide track 178 of the illustrated guide track link 176 includes a first end 230 corresponding to the non-actuated position 98 (FIG. 2) of the handle 116 and a second end 232 corresponding to the fully-actuated position 100 (FIG. 2) of the handle 116. Each guide track 178 further includes a first longitudinal section 234 extending longitudinally from the first end 230 to an intermediate location 236 corresponding to the intermediate position 100 (FIG. 2), and a second longitudinal section 238 extending from the second end 232 to the intermediate location 236. As shown, the second longitudinal section 238 is offset laterally (i.e., circumferentially) on the guide track link 176 with respect to the first longitudinal section 234.

The first longitudinal section 234 terminates at a shoulder 240 defined in the guide track 178 at the intermediate location 236. Accordingly, the first end 230 of the guide track 178 and the shoulder 240 respectively define first and second ends of the first longitudinal section 234. The intermediate stop location 236 includes a tapered portion 242 located laterally (i.e., circumferentially) adjacent the shoulder 240. Each guide track 178 further includes a locking recess section 244 at the second end 232 of the guide track laterally (i.e., circumferentially) offset from the second longitudinal section 238. The locking recess section 244 is offset from the second longitudinal section 238 in the same direction that the first longitudinal section 234 is offset from the second longitudinal section 238. The slots 158 in the handle link 160 (FIG. 8) extend circumferentially on the handle link to guide lateral movement of the pin 180 (e.g., from the first longitudinal section 234 to the second longitudinal section 238). As shown in phantom in FIG. 6, a cover can be annular disposed around the handle assembly 112 to maintain the pin 180 within the assembly (i.e., prevent the pin from sliding along its axis). This cover is not shown in FIGS. 3-5 and FIGS. 7-14A.

The illustrated lever assembly 112 further includes a button link 250 (shown in isolation in FIG. 9) connected to the button actuator 118 for movement therewith. The button link 250 defines an angled slot 252 adjacent a first or inner end 254. As shown, the button link 250 of the illustrated embodiment has a generally flat, elongated configuration. The pin 180 is received through the angled slot 252. The button link 250 can also include a second slot 256 longitudinally extending adjacent a second or outer end 258 of the button link 250. With reference to FIG. 4, the rivet-type pin 168 is received through the slot 256 for guiding longitudinal movement of the button link 250. The button link 250 includes a flange portion 260 adjacent the outer end 258 for connecting to a shaft portion 262 of the button actuator 118. A spring 264 annularly disposed about the outer end 258 of the button link 250 has a first end 266 that acts against the flange portion 260 of the button link 250 and a second end 268 that acts against the end 156 of the handle link 160. The button link 250 is disposed within the handle link 160. By this arrangement, the spring 264 urges the button actuator 118 (and therefore the button link 250) in the first direction (to the left in FIG. 4) when the button actuator 118 is not depressed by the pilot.

With reference to FIGS. 10 and 10A, when the handle 116 is in the non-actuated position of the first stage (i.e., the handle has not been pulled by the pilot), the pin 180 is located at the first end 230 of the guide track. Also, the pin 180 is located at a first position in the angled slot 252 of the button link 250 and at a first position in the laterally extending slot 158 of the handle link 160. With reference to FIGS. 11 and 11A, when the handle 116 is pulled by the pilot in the first stage, the handle link 160 and the button link 250 are also pulled together with the handle 116. During this first stage operation, the pin 180 can be moved from the first end 230 to the intermediate location 236 in the guide track 178 and the emergency brake pressure increases according to the position of the handle 116. The pilot cannot pull the handle 116 beyond the intermediate stop location in the guide track 178 (i.e., into the second stage) without depressing the button actuator 118, because contact between the pin 180 and the shoulder 240 prevents movement of the pin 180 into the second longitudinal section 238.

When the button actuator 118 is depressed by the pilot (in the direction of arrow 288 in FIG. 12A), the button link 250 is moved with respect to the handle 116 and the handle link 160 and is also moved with respect to the guide track link 176. The movement of the button link 250 is in the direction of arrow 290. This relative movement between the button link 250 and the handle link 160 moves the pin 180 in the angled slot 252 of button link 250 from the first position (i.e., the position shown in FIG. 10A) to a second position in the angled slot 252. This movement of the pin 180 caused by the relative movement between the button link 250 and the handle link 160 also results in movement of the pin 180 in the laterally extending slot 158 of handle link 160 (in the direction of arrow 292 in FIG. 12A) from the first position in slot 158 to a second position. At the same time, the pin 180 is also moved laterally within the guide track 178 of guide track link 176 at the intermediate location 236 from the first longitudinal section 234 to the second longitudinal section 238.

Once the pin 180 is placed in the second longitudinal section 238 of the guide track 178, the pin 180 is free to move longitudinally along the second longitudinal section 238. Therefore, the handle 116 is free to be moved in the second stage from the intermediate position 102 (FIG. 2) toward the fully-actuated position 100 (FIG. 2) in the direction of arrow 294 (FIG. 13). During this operation in the second stage, the pin 180 moves from the intermediate location 236 toward the second end 232 in the guide track 178 and the emergency brake pressure further increases according to position of the handle 116, as shown in FIG. 2. This two stage operation system prevents the pilot from pulling the handle 116 with too strong a force in an emergency situation.

Referring to FIGS. 13 and 14, when the button actuator 118 is released by the pilot with the handle 116 located at the fully-actuated position 100 (FIG. 2), the button link 250 is moved by the force of spring 264 with respect to the handle 116, the handle link 160 and the guide track link 176. The movement of the button link 250 is in the direction of arrow 298. This movement forces the pin 180 to return to the first pin position in the angled slot 252 of button link 250 and to the first pin position in the laterally extending slot 158 of handle link 160, as shown in FIG. 14. With respect to the guide track link 176, the movement of the pin 180 locates the pin in the locking recess section 244 of guide track 178. The maximum brake pressure is provided at the fully-actuated position 100 (FIG. 2). With the pin 180 located in the locking recess section 244, contact between the pin 180 and a shoulder 270 defined by the locking recess section 244 prevents the pin 180 from being moved back toward the intermediate position 102 (FIG. 2). This locks the handle 116 at the fully-actuated position 100. To release the handle 116 from the fully-actuated position 100 of the second stage, the button actuator 118 is depressed again to move the button link 250, which causes the pin 180 to be relocated from the locking recess section 244 of the guide track link 176 back into the second longitudinal section 238. From here, the pin 180 is free to be moved along the guide tracks 178 of guide track link 176 as the handle 116 is returned toward the intermediate position 102 and the non-actuated position 98. At the intermediate position 102, the biasing force of spring 264 urges pin 180 toward the first pin position in angled slot 252 of button link 250 and toward the first pin position of the lateral slot 158 of handle link 160. This moves the pin 180 from the second longitudinal section 238 to the first longitudinal section 236. The tapered portion 242 of the guide track 178 facilitates the lateral transfer of the pin 180 between the longitudinal sections.

Figure 15:
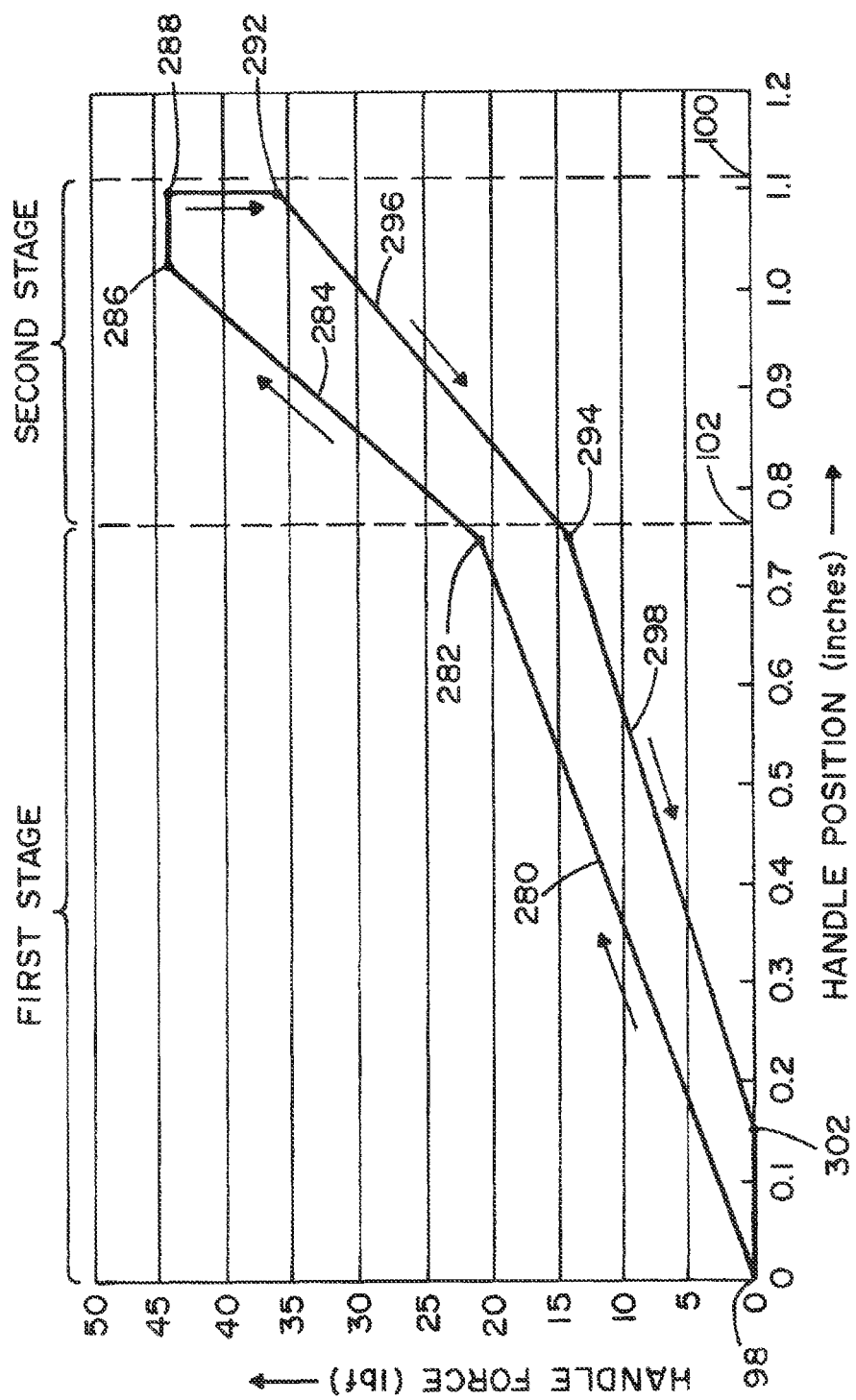
FIG. 15 is a graph depicting handle position versus handle force for movement of the handle of the lever assembly depicted in FIGS. 3-14.

FIG. 15 shows the relationship between handle position and handle force for the two-stage emergency/parking brake system described above. As shown, a larger force is needed at the second stage compared with the first stage. This system prevents the pilot from providing too much force for the handle 116 in an emergency situation. To pull the handle 116 (FIG. 1) from the non-actuated position 98 to the intermediate position 102, the force on the handle 116 increases linearly as depicted by line 280, which is shown connecting the non-actuated position 98 to a point 282 on the line 280 near where the handle 116 is in the intermediate position 102. To pull the handle 116 (FIG. 1) from the intermediate position 102 to the fully-actuated position 100, the force on the handle 116 increases linearly along a line 284. The slope of the line 284 connecting the point 282 to the point 286 (at which the brakes 14a, 14b are fully actuated) is greater than the slope of the line 280, which shows that an increasingly larger force is needed to pull the handle 116 during the second stage as compared with the first stage. The force on the handle 116 to move the handle 116 from the point 286 to a point 288 nearest the full actuated position 100 remains constant, e.g., at about 44 lbf in FIG. 15.

To push the handle 116 from the fully-actuated position 100 back to the non-actuated position 98 less force is needed as compared to when the handle 116 is pulled. The return stroke of the handle 116 requires a decreasing force between a point 292, which is the point nearest the fully-actuated position 100 of the handle 116, to a point 294, which is the point nearest the intermediate position 102 of the handle 116 (shown as line 296). The amount of force required to push the handle 116 along the line 296 from the fully-engaged position 100 to the intermediate position 102 is less than the force that was required to pull the handle 116 along line 284 from the intermediate position 102 to the fully-engaged position 100. To push the handle 116 from the intermediate position 102 to the non-actuated position 98 requires even less force. As shown, the slope of a line 298 between the point 294 and a point 302 is less than a slope of line 296. The force required to push the handle 116 (i.e., to return the handle 116) along line 298 in the first stage is less than the force that was required to pull the handle 116 along line 280 in the first stage.

In an alternative arrangement, the lever assembly 112 could be configured so that rotation of the handle 116 about its longitudinal axis with respect to the guide track link 176 would allow for further movement of the handle 116 beyond the intermediate stop position 102 (FIG. 2) toward the fully-actuated position 100 (FIG. 2). In this embodiment, the button actuator 118 would be unnecessary to shift the pin 180 between the first and second longitudinal sections 234, 238 of guide track 178. The slot 252 of handle link 250 could be appropriately configured so that rotation of the handle link 250 (caused by rotation of handle 252) moves the pin 180 from the first pin positions in angled slot 252 of button link 250 and laterally extending slot 158 of handle link 160 to the second pin positions. At the same time, the pin 180 is also moved from the first longitudinal section 236 of guide track 178 into the second longitudinal section 238. The pilot could then pull the handle 116 to the fully-actuated position 100 (FIG. 2) with the handle 316 still rotated. The handle 316 could then be rotated back (the handle 116 could be biased against the initial rotation) to apply the parking brake (i.e., to move the pin 180 into the locking recess section 244 of guide track 178 and lock the handle 116 at the fully-actuated position 100).

FIGS. 16-20 illustrate another embodiment of a lever assembly 312, which can be functionally equivalent to the lever assembly 92 shown in FIG. 1. The lever assembly 312 can be used in replacement of the lever assembly 112 depicted in FIG. 3. As such, the lever assembly 312 can be part of an aircraft emergency/parking brake system, similar to the emergency/parking brake system depicted in FIG. 3. The lever assembly 312 includes a handle 316 connected with a link 322. The handle 316 can be disposed in a cockpit area 114 (FIG. 3) of an aircraft. The handle 316 is functionally equivalent to the handle 94 shown in FIG. 1. As such, the handle 316 can be provided to operate the emergency/parking brake valve 94 shown in FIG. 1. The link 322 connects with a push-pull cable 324, which operates in a similar manner to the push-pull cable 124 described above.

The lever assembly 312 includes the handle 316, a button 318, the link 322, a stopper 330 and a parking release lever assembly 332. The handle 316 includes a grip section 334, an arm section 336, and a mounting section 338. The grip section 334 is located on the opposite side of the arm section 336 as the mounting section 338. The grip section 334 is configured to be grasped by a pilot. The mounting section 338 includes an axle hole 340 that receives an axle 342. The axle 342 also connects with the link 322. This allows the handle 316 and the link 322 to rotate about an axis 344 defined by the axle 342. The handle 316 also includes a button assembly bore 346 that receives a button assembly 350.

The button assembly 350 includes the button 318, a plunger 352 connected with the button 318, a projection 354 connected (or integrally formed) with the button 318, and a spring 356 contacting plunger 352 to bias button 318 (and projection 354) with respect to the handle 316. A fastener 364 received through an opening 362 in a head 360 of button 318 secures the button 318 to the plunger 352.

The plunger 352 includes a main body 366 and a stem 368 extending from the main body 366 opposite the button 318. The plunger 352 defines a first shoulder 370 at the junction between the main body 366 and the stem 368. The plunger 352 also includes a second shoulder (or dimple) 372 on a side of the main body 366 opposite the stem 368. The projection 354 extends radially (with respect to the button 318) from the button head 360 toward the stopper 330 and defines a contact edge 376.

The spring 356 is received in the button assembly bore 346 and surrounds the stem 368 of the plunger 352. The spring 356 acts against the first shoulder 370 of the plunger 352 to bias the button 318 and the projection 354 in an axial direction as depicted by arrow 380.

The stopper 330 is a curved member generally following a radius defined by the rotational axis 344. In the illustrated embodiment, the stopper 330 includes a first curved member 382 and a second curved member 384. The first curved member 382 defines a contact surface 386. The second curved member 384 defines an internal surface 388.

The parking release lever assembly 332 includes a lever 390 connected with a trigger 392. The lever 390 is biased by a spring 394 in a linear direction as depicted by arrow 396. The lever 390 includes an extension 398 that contacts the main body 366 of the plunger 352.

Figure 16:
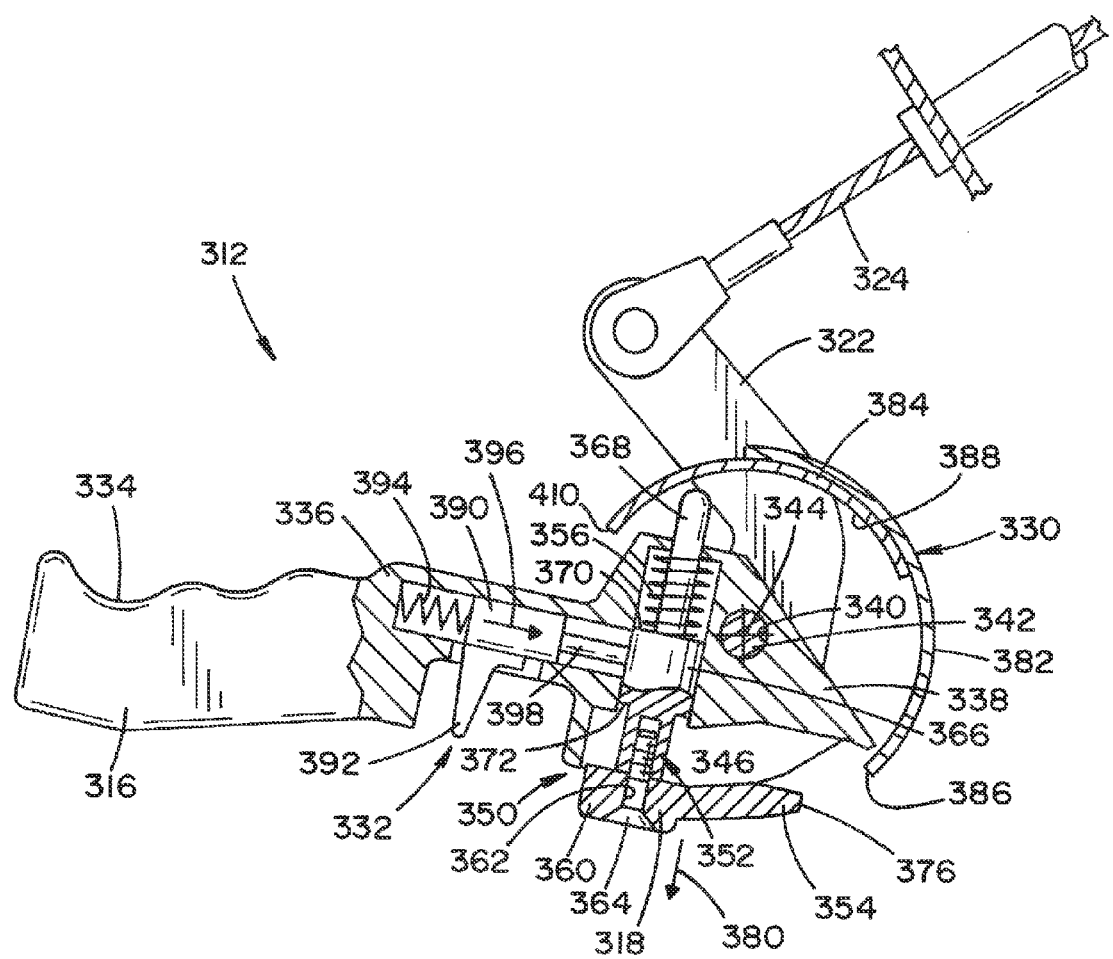
FIG. 16 is a partial cross-sectional view of an alternative lever assembly, which is shown in a non-actuated position, for use with the hydraulic brake system depicted in FIG. 1.
Figure 17:
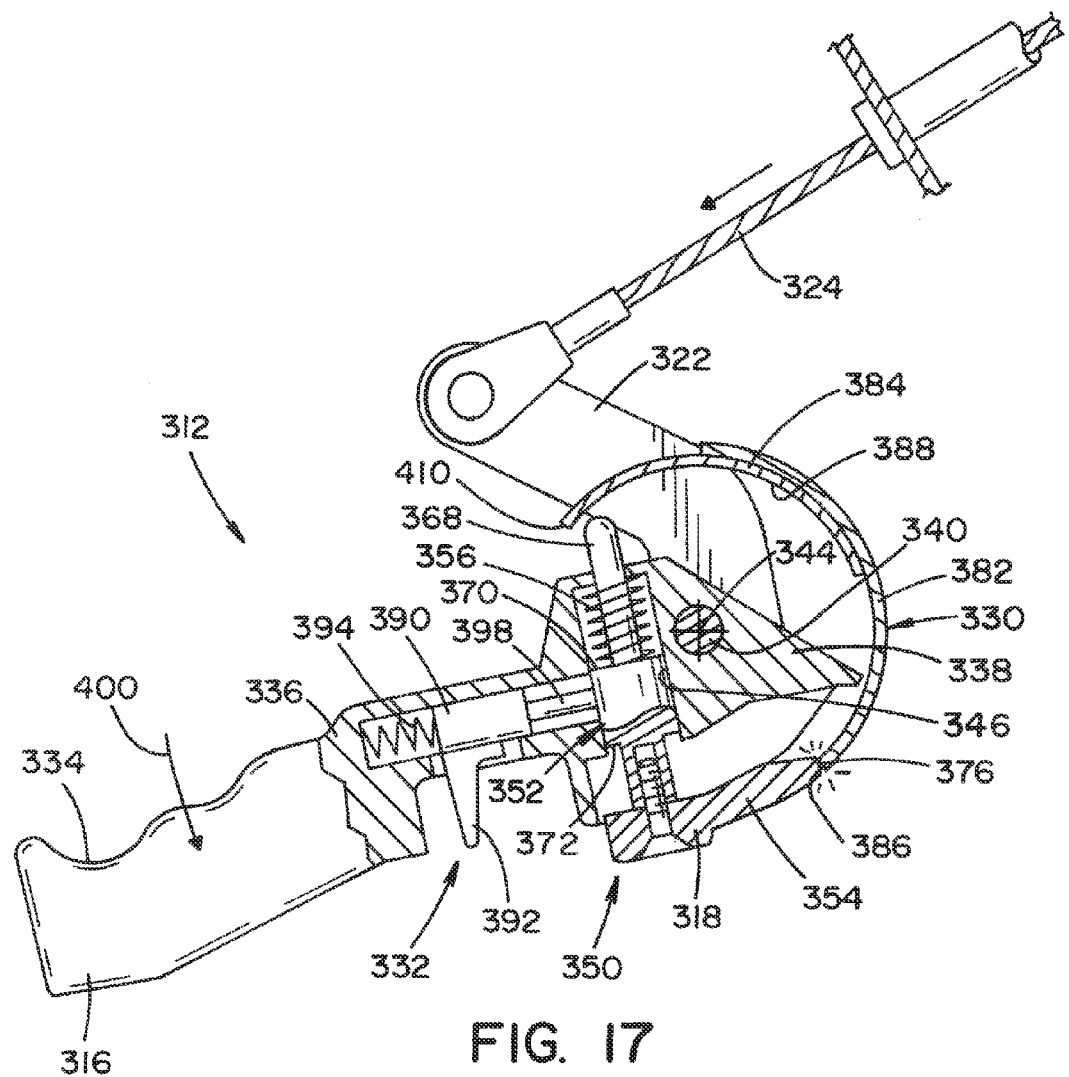
FIG. 17 is a view of the lever assembly shown in FIG. 16 in the intermediate position before a button actuator is depressed.

FIG. 16 depicts the handle 316 in a non-actuated position 98 (FIG. 2). With reference to FIG. 17, the pilot grasps the handle 316 and rotates the handle about the rotational axis 344 in the direction of arrow 400 (FIG. 17). During this operation, the aircraft emergency/parking brake system operates in the first stage, which is shown in FIG. 2, until the contact edge 376 of projection 354 contacts the contact surface 386 of stopper 330. When the handle 316 is in the position shown in FIG. 17, the handle 316 is in the intermediate position 102 shown in FIG. 2. The button assembly 350 and the stopper 330 operate as a lock mechanism to obstruct the handle from moving from a first stage position where the emergency brake system is operative in the first stage (see FIG. 2), to a second stage position, where the emergency brake system is operative in the second stage (see FIG. 2).

Figure 18:
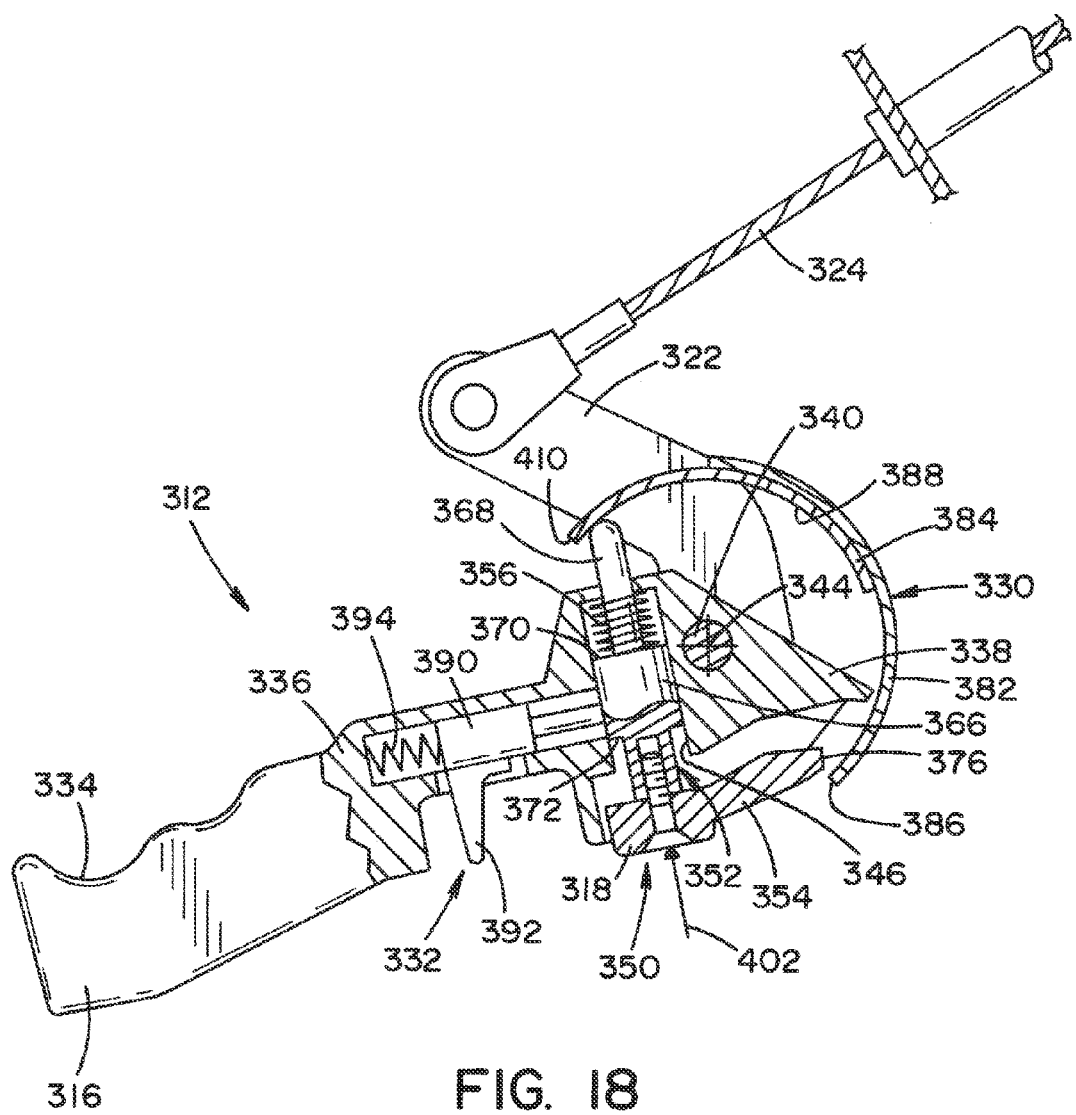
FIG. 18 is a view of the lever assembly shown in FIG. 16 in the intermediate position with the button actuator depressed.

With reference to FIG. 18, with the handle 316 in the intermediate position 102 (FIG. 2), the pilot pushes the release button 318 in a linear direction (in the direction of arrow 402) against the biasing force of the spring 356. The stem 368 of the plunger 352 contacts the internal surface 388 of stopper 330 to limit the travel of the button 318 in the direction of arrow 402. This movement shown in FIG. 18 results in the contact edge 376 of the projection 354 moving off of the contact surface 386 of the stopper 330.

Figure 19:
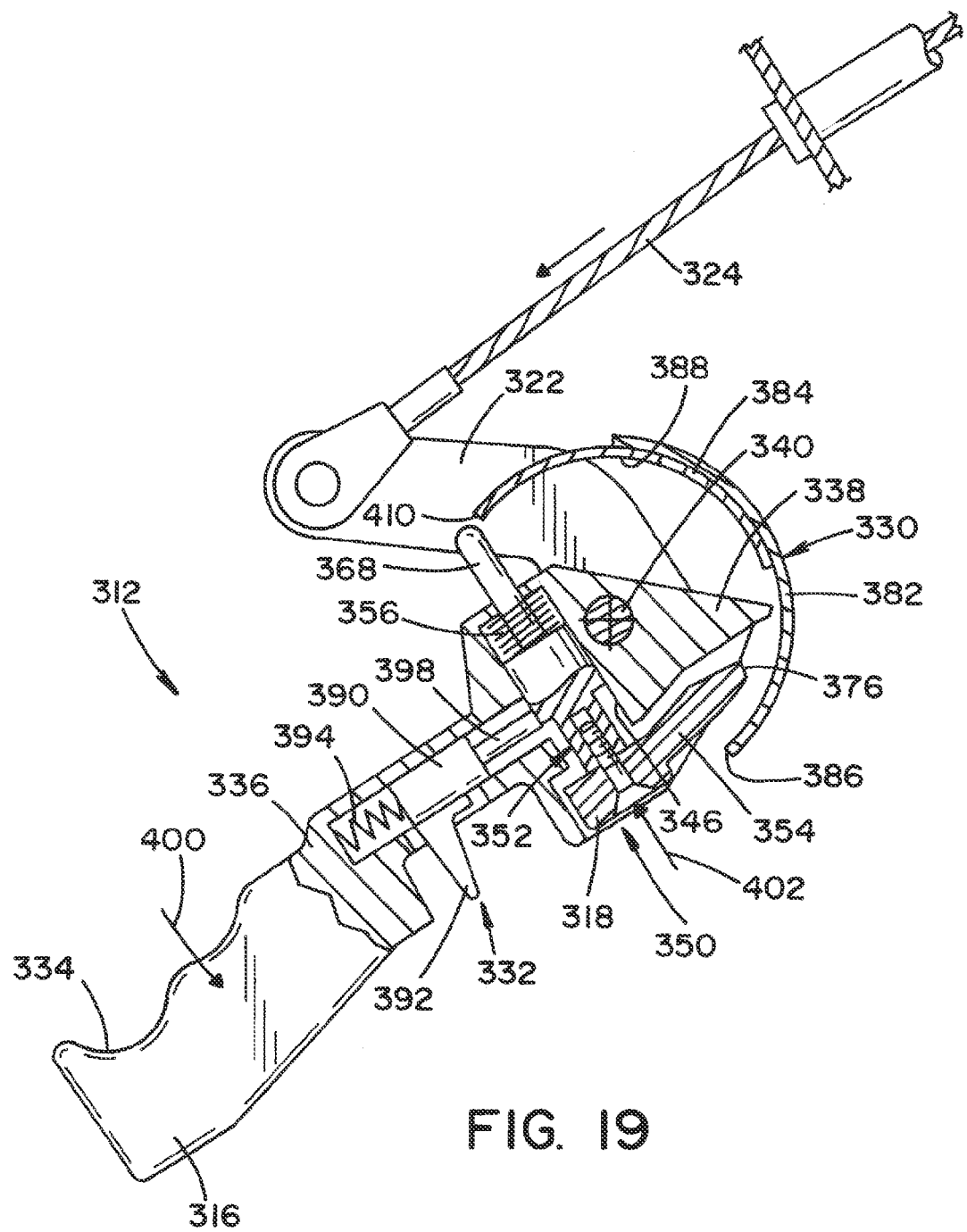
FIG. 19 is a view of the lever assembly shown in FIG. 16 in the fully-actuated position.

With reference to FIG. 19, with the contact edge 376 of the projection 354 offset from the contact surface 386 of the stopper 330, the pilot can further pull the handle 316 (i.e., rotate the handle) in the rotational direction depicted by arrow 400 toward the fully-actuated position 100 (FIG. 2).

Figure 20:
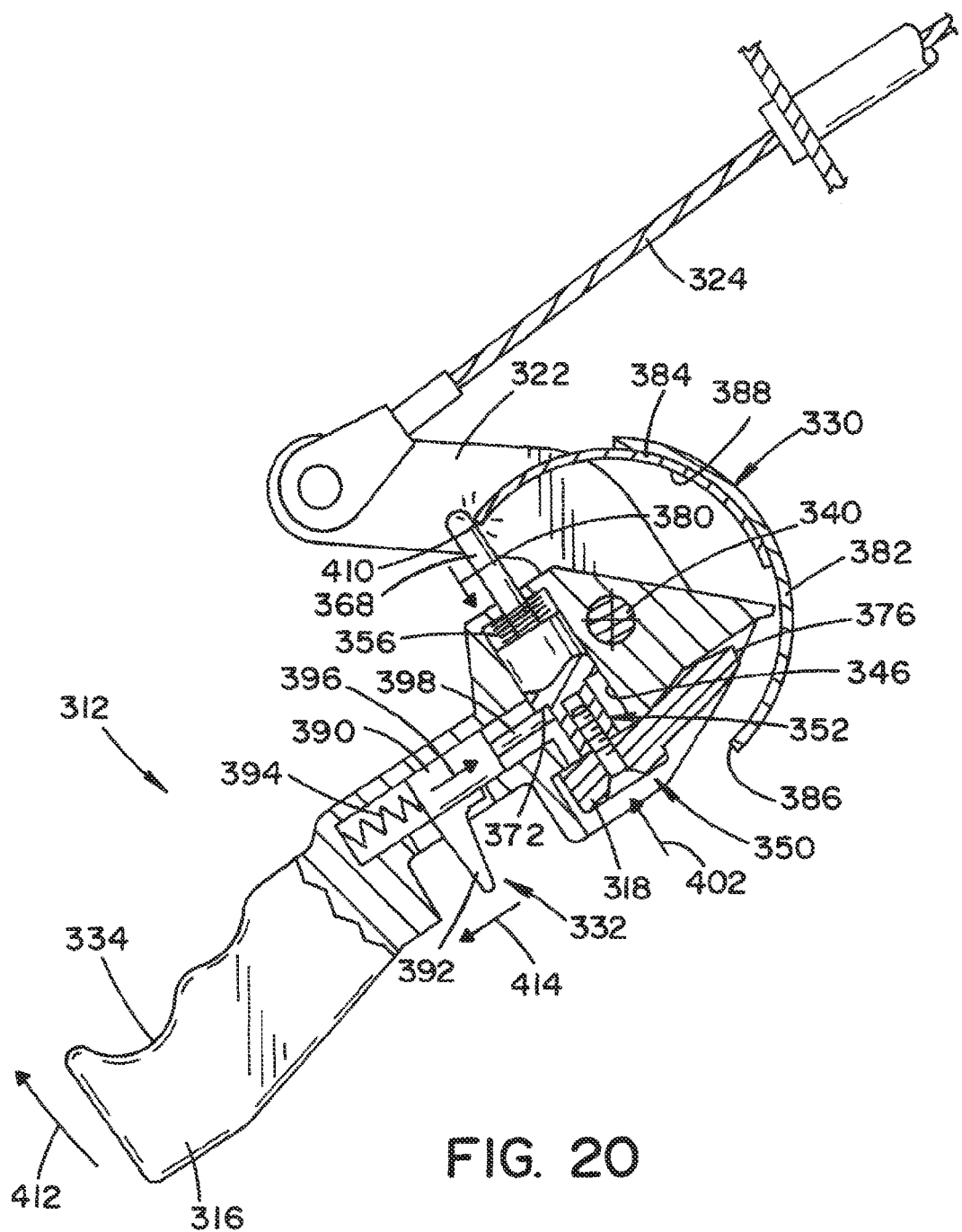
FIG. 20 is a view of the lever assembly shown in FIG. 16 in the fully-actuated position in a parking state.

With reference to FIG. 20, with the handle 316 in the fully-actuated position 100 (FIG. 2), the stem 368 of the plunger 352 travels beyond an edge 410 of the stopper 330. This edge 410 is at an opposite end of the stopper 330 as the contact surface 386. The button 318 can be further depressed in the direction of arrow 402 so that the stem 368 of the plunger 352 contacts the edge 410 of the stopper 330. The spring 394 biases the lever 390 of the parking release lever assembly 332 in the direction of arrow 396. Thus, the extension 398 of the lever 390 extends into the dimple 372. This fixes the position of the plunger 352 with respect to the stopper 330 and precludes rotation of the handle 316 in the direction of arrow 412, which is opposite the direction of arrow 400. The handle 316 is locked in the fully-actuated position 100 (i.e., placed in park). To release the handle from park, the pilot pulls the trigger 392, which is connected to the lever 390, against the biasing force of the spring 394 in a direction generally designated by arrow 414. This results in the spring 356 biasing plunger 352 in the direction of arrow 380, which allows the stem 368 of the plunger 352 to clear the end 410 of the stopper. The link 322 is biased in the same direction as the arrow 412 so that the handle 316 can return to the non-actuated position 98 (FIG. 2).

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An emergency brake system for an aircraft comprising:
   a modulating emergency/parking brake valve in fluid communication with and disposed between a pressure source and a wheel brake, the emergency brake system being operative in a first stage to provide a moderate amount of brake pressure to the wheel brake and a second stage to provide a greater brake pressure to the wheel brake; and
   a lever assembly operatively connected with the brake valve, the lever assembly including
      a handle being movable between a non-actuated position where the wheel brake is disengaged and a fully-actuated position where the wheel brake is fully engaged, wherein the brake pressure provided to the wheel brake through the brake valve is provided according to a position of the handle;
      a lock mechanism operatively connected with the handle to obstruct the handle from moving from a first stage to a second stage; and
      an unlock mechanism disposed on the handle to unlock the lock mechanism to allow the handle to move to the second stage from the first stage, the unlock mechanism including a button cooperating with the lock mechanism, wherein the button is movable with respect to the handle and is depressed to unlock the lock mechanism.

2. The system of claim 1, wherein the handle is movable from the non-actuated position to an intermediate position, which is between the non-actuated position and the fully-actuated position, wherein the handle is precluded from movement from the intermediate position towards the fully-actuated position when the lock mechanism is locked.

3. The system of claim 2, wherein the emergency brake system is in the first stage when the handle is in any position between the non-actuated position and the intermediate position.

4. The system of claim 2, wherein the emergency brake system is in the second stage when the handle is in any position between the intermediate position and the fully-actuated position.

5. The system of claim 2, wherein the brake pressure provided to the wheel brake through the brake valve in the first stage is provided according to a position of the handle such that a lower brake pressure is provided to the wheel brake when the handle is nearer the non-actuated position as compared to the intermediate position.

6. The system of claim 5, wherein the brake pressure provided to the wheel brake through the brake valve in the second stage is provided according to a position of the handle such that a lower brake pressure is provided to the wheel brake when the handle is nearer the intermediate position as compared to the fully-actuated position.

7. The system of claim 1, wherein the handle moves linearly between the non-actuated position and the fully-actuated position.

8. The system of claim 2, wherein the handle rotates between the non-actuated position and the intermediate position.

9. The system of claim 1, wherein the button is located on the handle.

10. A method for operating an emergency brake system for an aircraft, wherein the brake system includes a modulating emergency/parking brake valve in fluid communication with a pressure source and a wheel brake, the brake valve being disposed between the pressure source and the wheel brake, the method comprising:
    operating the emergency brake system in a first stage by moving a handle of a lever assembly from a non-actuated position where the wheel brake is disengaged to an intermediate position where the handle is precluded from further movement toward a fully-actuated position until a lock mechanism, which is operatively connected with the handle, is unlocked;
    unlocking the lock mechanism by pushing a button connected with the handle and moving the button with respect to the handle; and
    operating the emergency brake system in a second stage by moving the brake handle from the intermediate position toward the fully-actuated position after unlocking the lock mechanism.

11. The method of claim 10, wherein operating the emergency brake system in the first stage and operating the emergency brake system in the second stage includes moving the handle in a linear direction.

12. The method of claim 10, wherein operating the emergency brake system in the first stage and operating the emergency brake system in the second stage includes rotating the handle about an axis.

13. The method of claim 10, wherein operating the emergency brake system in the first stage further includes increasing brake pressure applied to the wheel brake by moving the handle toward the intermediate position.

14. The method of claim 13, wherein operating the emergency brake system in the second stage further includes increasing brake pressure applied to the wheel brake by moving the handle from the intermediate position toward the fully-actuated position.

15. A lever assembly for an aircraft emergency/parking brake, comprising:
    a handle movable between a non-actuated position wherein the brake is disengaged and a fully-actuated position wherein the brake is fully engaged, the handle being freely movable from the non-actuated position to an intermediate position wherein during movement therebetween the brake applies a braking force based upon a position of the handle; and
    a lock mechanism operatively connected with the handle, movement of the handle from the intermediate position to the fully-actuated position being obstructed by the lock mechanism to prevent inadvertent operating of the brake in the fully-actuated position unless the lock mechanism is unlocked; and
    an unlocking mechanism operatively connected with the handle for unlocking the lock mechanism, the unlocking mechanism including a button on the handle and movable with respect to the handle, wherein movement of the handle from the intermediate position toward the fully-actuated position is obstructed unless the button is depressed.

16. A lever assembly for an aircraft emergency/parking brake, comprising:
    a handle rotatable between a non-actuated position wherein the brake is disengaged and a fully-actuated position wherein the brake is fully engaged, the handle being freely rotatable from the non-actuated position to an intermediate position wherein during movement therebetween the brake applies a braking force based upon a position of the handle; and a lock mechanism operatively connected with the handle, movement of the handle from the intermediate position to the fully-actuated position being obstructed by the lock mechanism to prevent inadvertent operating of the brake in the fully-actuated position unless the lock mechanism is unlocked; and an unlocking mechanism operatively connected with the handle for unlocking the lock mechanism.

17. The lever assembly of claim 16, wherein the lock mechanism includes a button on and movable with respect to the handle, wherein movement of the handle from the intermediate position toward the fully-actuated position is obstructed unless the button is depressed.

* * * * *